United States Patent
Karras et al.

(10) Patent No.: US 11,263,525 B2
(45) Date of Patent: Mar. 1, 2022

(54) PROGRESSIVE MODIFICATION OF NEURAL NETWORKS

(71) Applicant: NVIDIA Corporation, Santa Clara, CA (US)

(72) Inventors: Tero Tapani Karras, Helsinki (FI); Timo Oskari Aila, Tuusula (FI); Samuli Matias Laine, Vantaa (FI); Jaakko T. Lehtinen, Helsinki (FI); Janne Hellsten, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 713 days.

(21) Appl. No.: 16/252,336

(22) Filed: Jan. 18, 2019

(65) Prior Publication Data

US 2019/0171936 A1 Jun. 6, 2019

Related U.S. Application Data

(63) Continuation-in-part of application No. 16/156,994, filed on Oct. 10, 2018.

(Continued)

(51) Int. Cl.
*G06N 3/08* (2006.01)

(52) U.S. Cl.
CPC .............. *G06N 3/08* (2013.01); *G06N 3/082* (2013.01)

(58) Field of Classification Search
CPC .................................. G06N 3/08; G06N 3/082
See application file for complete search history.

(56) References Cited

U.S. PATENT DOCUMENTS

| 9,767,381 B2 | 9/2017 | Rodriguez-Serrano et al. |
| 2015/0134583 A1 | 5/2015 | Tamatsu et al. |

(Continued)

FOREIGN PATENT DOCUMENTS

| CN | 106993851 A | 8/2017 |
| CN | 107103590 A | 8/2017 |

(Continued)

OTHER PUBLICATIONS

Zhao, Zhong-Qiu, et al. "Plant leaf identification via a growing convolution neural network with progressive sample learning." Asian Conference on Computer Vision. Springer, Cham, 2014. (Year: 2014).*

(Continued)

*Primary Examiner* — Hal Schnee
(74) *Attorney, Agent, or Firm* — Leydig, Voit & Mayer, Ltd.

(57) ABSTRACT

A neural network learns a particular task by being shown many examples. In one scenario, a neural network may be trained to label an image, such as cat, dog, bicycle, chair, etc. In other scenario, a neural network may be trained to remove noise from videos or identify specific objects within images, such as human faces, bicycles, etc. Rather than training a complex neural network having a predetermined topology of features and interconnections between the features to learn the task, the topology of the neural network is modified as the neural network is trained for the task, eventually evolving to match the predetermined topology of the complex neural network. In the beginning the neural network learns large-scale details for the task (bicycles have two wheels) and later, as the neural network becomes more complex, learns smaller details (the wheels have spokes).

20 Claims, 22 Drawing Sheets

Related U.S. Application Data

(60) Provisional application No. 62/577,611, filed on Oct. 26, 2017.

(56) References Cited

U.S. PATENT DOCUMENTS

| | | | |
|---|---|---|---|
| 2017/0345140 A1 | 11/2017 | Zhang et al. | |
| 2017/0365038 A1 | 12/2017 | Denton et al. | |
| 2018/0046894 A1 | 2/2018 | Yao | |
| 2018/0225823 A1 | 8/2018 | Zhou et al. | |
| 2018/0268284 A1* | 9/2018 | Ren | G06N 3/04 |
| 2018/0330511 A1 | 11/2018 | Ha et al. | |
| 2020/0184262 A1 | 6/2020 | Chui et al. | |
| 2020/0285939 A1 | 9/2020 | Baker | |
| 2021/0133576 A1 | 5/2021 | Hutter et al. | |
| 2021/0217219 A1 | 7/2021 | Zhou et al. | |

FOREIGN PATENT DOCUMENTS

| | | | |
|---|---|---|---|
| CN | 107392973 A | 11/2017 | |
| CN | 107423700 A | 12/2017 | |
| CN | 107423701 A | 12/2017 | |
| CN | 107451994 A | 12/2017 | |
| CN | 107563509 A | 1/2018 | |
| CN | 107590530 A | 1/2018 | |
| CN | 107798669 A | 3/2018 | |
| CN | 107945118 A | 4/2018 | |
| CN | 107992944 A | 5/2018 | |
| CN | 107993190 A | 5/2018 | |
| CN | 108009058 A | 5/2018 | |
| CN | 108334847 A | 7/2018 | |
| EP | 3557490 A1 | 10/2019 | |

OTHER PUBLICATIONS

Karras et al.., "Progressive Growing of GANs for Improved Quality, Stability, and Variation," ICLR 2018, Feb. 26, 2018, retrieved from https://arxiv.org/abs/1710.10196, 24 pages.

Isola et al., "Image-to-Image Translation with Conditional Adversarial Networks," 2017 IEEE Conference on Computer Vision and Pattern Recognition, Nov. 22, 2017, retrieved from https://arxiv.org/pdf/1611.07004.pdf, 10 pages.

Wang et al., "Structural inference embedded adversarial networks for scene parsing," PLOS One, Apr. 12, 2018, 29 pages.

Lehtinen et al., "Noise2Noise: Learning Image Restoration without Clean Data," CVPR, 2018, 12 pages. Retrieved from <https://arxiv.org/pdf/1803.04189.pdf>.

Alla Chaitanya et al., "Interactive Reconstruction of Monte Carlo Image Sequences using a Recurrent Denoising Autoencoder," NVIDIA Research Online Publication, 2017, 12 pages. Retrieved from <https://research.nvidia.com/sites/default/files/publications/dnn_denoise_author.pdf>.

U.S. Appl. No. 16/156,994, filed Oct. 10, 2018.

* cited by examiner

PROGRESSIVE MODIFICATION OF NEURAL NETWORKS

CLAIM OF PRIORITY

This application is a continuation-in-part of U.S. Non-Provisional application Ser. No. 16/156,994 (Attorney Docket No. NVIDP1193/17-HE-0239-US02) titled "Progressive Modification of Generative Adversarial Neural Networks," filed Oct. 10, 2018 which claims the benefit of U.S. Provisional Application No. 62/577,611 (Attorney Docket No. NVIDP1193+/17-HE-0239-US01) titled "Progressive Growing of Generative Adversarial Networks," filed Oct. 26, 2017, the entire contents of both applications is incorporated herein by reference.

FIELD OF THE INVENTION

The present invention relates to neural networks, and in particular, to modifying a topology of a neural network during training.

BACKGROUND

A neural network may be trained to label images, detect objects in images, process corrupt images to produce clean images, or the like. Training is time-consuming, particularly when the number of layers in the neural network is high, as is the case for a deep neural network. Stability is also a problem during training when parameter values of the neural network fail to converge. There is a need for addressing these issues and/or other issues associated with the prior art.

SUMMARY

A neural network learns a particular task by being shown many examples. In one scenario, a neural network may be trained to label an image, such as cat, dog, bicycle, chair, etc. In another scenario, a neural network may be trained to remove noise from videos or identify specific objects within images, such as human faces, bicycles, etc. Rather than training a complex neural network having a predetermined topology of features and interconnections between the features to learn the task, the topology of the neural network is modified as the neural network is trained for the task. The topology of the neural network may be simple in the beginning and become more complex as the neural network learns during the training, eventually evolving to match the predetermined topology of the complex neural network. In the beginning the neural network learns large-scale details for the task (bicycles have two wheels) and later, as the neural network becomes more complex, learns smaller details (the wheels have spokes).

A method, computer readable medium, and system are disclosed for progressively modifying the topology of a neural network during training. The neural network is trained for a first time duration using a training dataset including training input data and training output data, where the topology of the neural network comprises features and interconnections between the features. At least one of the training input data and the training output data is modified to produce first modified training data. The training input data or the modified training input data is processed by the neural network according to parameters to produce network output data and the parameters are updated to reduce differences between the network output data and the training output data or the modified training output data. The topology of the neural network is modified to produce a modified neural network and, at least one of, the training input data and the training output data is modified to be consistent with the modified neural network to produce second modified training data that is different compared with the first modified training data. The modified neural network is then trained for a second time duration using the second modified training data.

DETAILED DESCRIPTION

A training technique for a neural network is disclosed that modifies the topology of the neural network by adding or removing layers (e.g. fully-connected layer, convolutional layer, upsampling, downsampling, pooling, normalization, capsule, and the like), adding or removing features (e.g. feature maps, neurons, activations, and the like), adding or removing connections between features, and the like. In an embodiment, modifications of the neural network topology change a processing capacity of the neural network. For example, training may start using low-resolution images, and as resolution of the images is progressively increased, processing layers may be added to the neural network. Such a progressive technique allows the training to first discover a large-scale structure of the data distribution and then shift attention to increasingly finer scale detail, instead of having to learn all scales simultaneously.

Figure 1A:
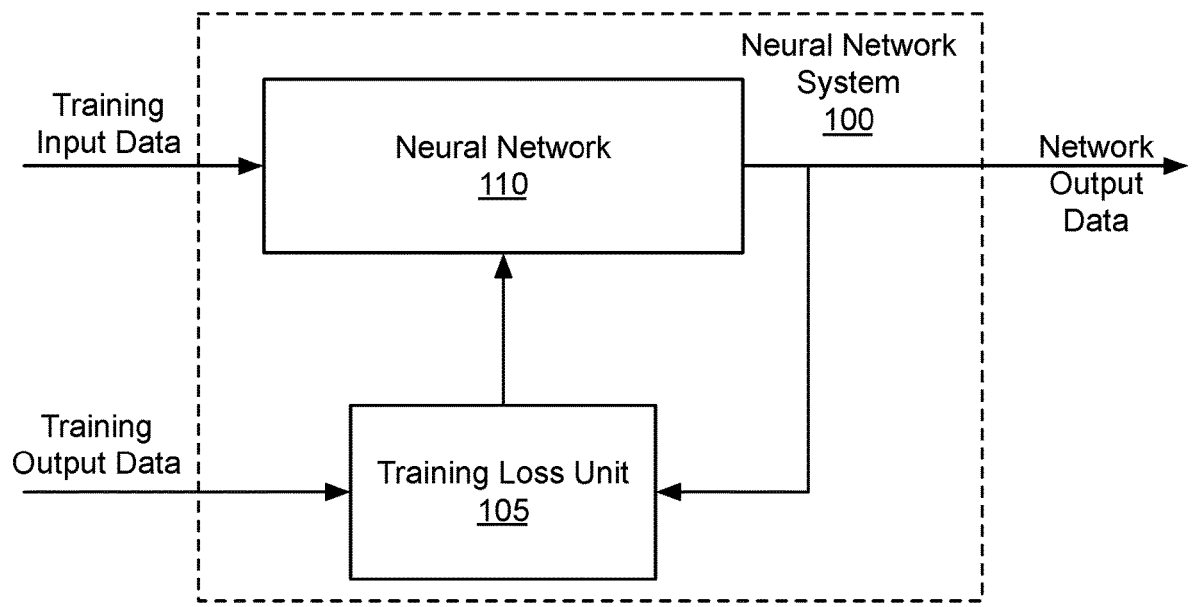
FIG. 1A illustrates a block diagram of a neural network system, in accordance with an embodiment.

FIG. 1A illustrates a block diagram of a neural network system 100, in accordance with an embodiment. The neural network system 100 may be implemented by a program, custom circuitry, or by a combination of custom circuitry and a program. For example, the neural network system 100 may be implemented using a GPU (graphics processing unit), CPU (central processing unit), or any processor capable of performing the operations described herein. Furthermore, persons of ordinary skill in the art will understand that any system that performs the operations of the neural network system 100 is within the scope and spirit of embodiments of the present invention.

The neural network system 100 includes a neural network 110 and a training loss unit 105. Topologies of the neural network 110 may be modified during training. The neural network 110 may be configured as an autoencoder, a U-net, a recurrent U-net, classifier, or the like. The neural network 110 may be configured to perform semantic segmentation, object detection, classification, image de-noising, video de-noising, or other tasks. The neural network 110 receives input data and produces network output data. In an embodiment, the neural network 110 is an object detection neural network and the network output data comprises zero or more labels for zero or more locations in the input data.

In the context of the following description, the neural network 110 operates in a supervised setting using a training dataset including training input data and training output data (ground truth) pairs. Depending on the task, the input and/or output may be an image, class label, per-pixel class label, per-region object class, object bounding boxes, confidence value, audio data, video data, or the like. The neural network 110 is trained so that the network output data produced by the neural network 110 matches the training output data as closely as possible when the training input data paired with the training output data is processed by the neural network 110.

The training loss unit 105 adjusts parameters (weights) of the neural network 110 based on differences between the network output data and the training output data. In one embodiment, the network output data generated by the neural network 110 is not required to be identical to the training output data for the training loss unit 105 to determine the network output data matches the training output data. For example, the loss unit 105 may compare the network output data and the training data using squared error (L2 loss), categorical cross-entropy, peak signal to noise ratio (PSNR), structural similarity (SSIM), perceptual distance, adversarial loss, another neural network, or the like. In the context of the following description, the training loss unit 105 determines that the network output data matches the training output data when a level of accuracy is achieved. The level of accuracy may be a predetermined threshold value (i.e., criterion). Alternatively, the level of accuracy may be deemed sufficient after a predetermined number of training steps has been performed or a predetermined amount of time has elapsed.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
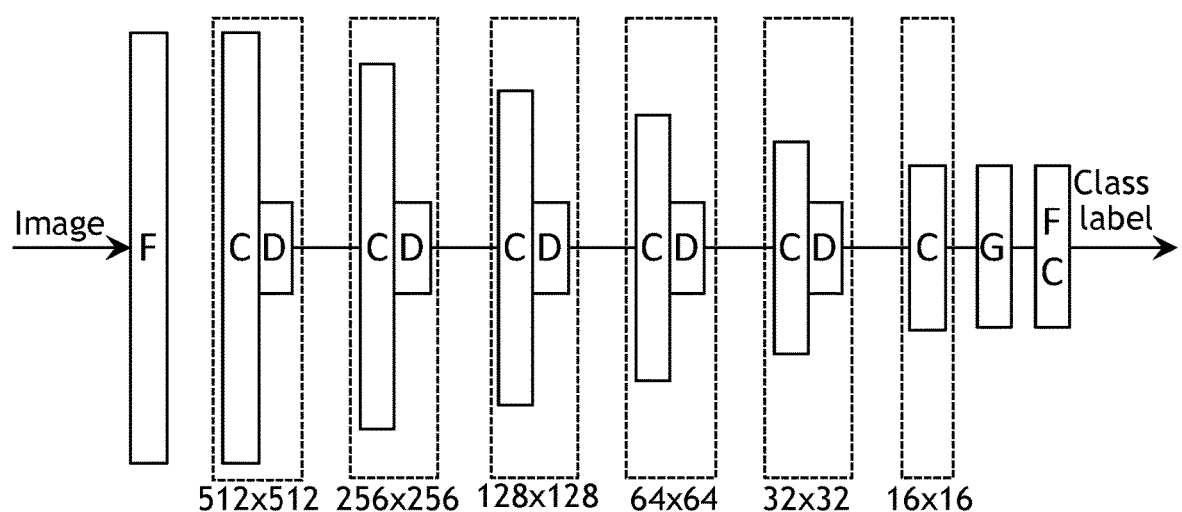
FIG. 1B illustrates a block diagram of an image classifier neural network topology, in accordance with an embodiment.

FIG. 1B illustrates a block diagram of an image classifier neural network topology, in accordance with an embodiment. In an embodiment, the neural network 110 comprises the image classifier neural network. The image classifier neural network includes multiple layers, where a conversion layer (F) converts the input (image) data into multiple channels of features. In one embodiment, the input data is encoded as color channels (e.g., red, green, blue) that are converted into multiple (e.g., 32, 48, 64, 96, etc.) channels of features.

As shown in FIG. 1B, a 512×512 layer includes a convolutional layer (C) followed by a downsampler (D). The downsampled intermediate data output by the 512×512 layer is processed, according to the parameters of the image classifier neural network by a 256×256 layer, then a 128×128 layer, a 64×64 layer, a 32×32 layer, and a 16×16 layer generates an intermediate output. The intermediate output is processed by a global pooling layer and a fully-connected layer generates the network output data (class label). A person skilled in the art will appreciate that FIG. 1B is for illustrative purposes only. In other embodiments, any group of layers in the figure may or may not comprise convolutional layers, fully-connected layers, average pooling, max pooling, global pooling, residual blocks, inception modules, or the like.

During training, the topology of the neural network is modified to add or remove layers, add or remove features (e.g. feature maps or neurons), add or remove connections between features, and the like. In an embodiment, modifications of the neural network topology change a processing capacity of the neural network. In an embodiment, the modifications are introduced smoothly by interpolating between the old and new topology and the old and new training input/output data.

Figure 1C:
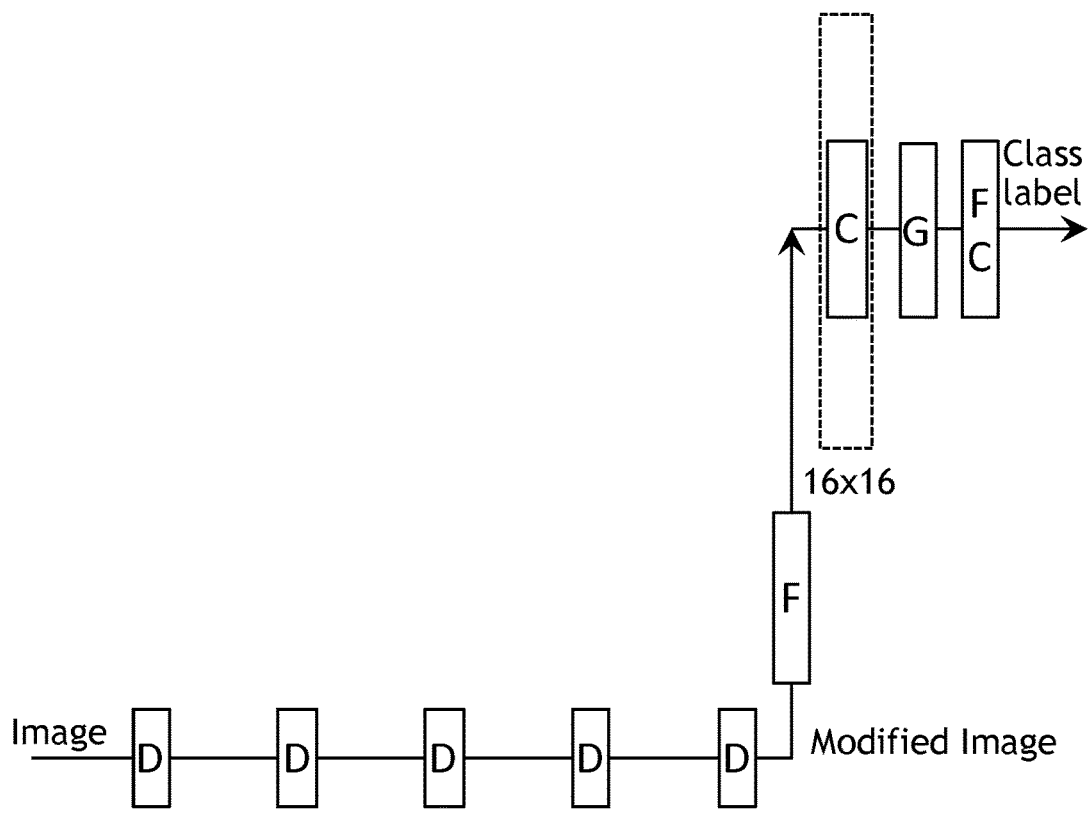
FIG. 1C illustrates a conceptual diagram of the image classifier neural network topology, progressively modified during training, in accordance with an embodiment.

FIG. 1C illustrates a conceptual diagram of the image classifier neural network topology, progressively modified during training, in accordance with an embodiment. In the context of the following description, one or more processing layers may be added, modifying the topology of the image classifier neural network and increasing the processing capacity. More specifically, the image classifier neural network may initially be configured in a first topology to process the input image using a single layer or only a few layers. As shown in FIG. 1C, a single 16×16 convolutional layer (C) generates an intermediate output. The intermediate output is processed by a global pooling layer and a fully-connected layer generates the output data (class label). The training dataset includes higher-resolution images, so the training input data (images) are downsampled by one or more downsamplers (D) before they are input to the 16×16 convolutional layer. In an embodiment, at least one downsampler is used to downsample the training input data to produce the modified images. In an embodiment, downsampling halves the density (i.e., spatial resolution) of the training input data corresponding to the first topology. In an embodiment, average pooling is used to halve the data. In an embodiment, the multiple downsamplers are fused together so that each downsampler reduces the data by e.g. 4× instead 2×.

Before being input to a layer of the neural network, the downsampled images (first modified training input data) are projected into an abstract feature representation (e.g., feature vectors) by the conversion layer (F). In an embodiment, for the first topology, the first modified training input data is 16×16 pixel resolution image data. In an embodiment, the network output data generated by the neural network is compared with a ground truth output data included in the training dataset. Parameters of the image classifier neural network are updated to reduce differences between the network output data and the ground truth output data.

The image classifier neural network, configured using the first topology shown in FIG. 1C, is trained for a first time duration before transitioning to a second topology. In an embodiment, the processing capacity of the image classifier neural network is increased as the first topology transitions to the second topology.

Figure 1D:
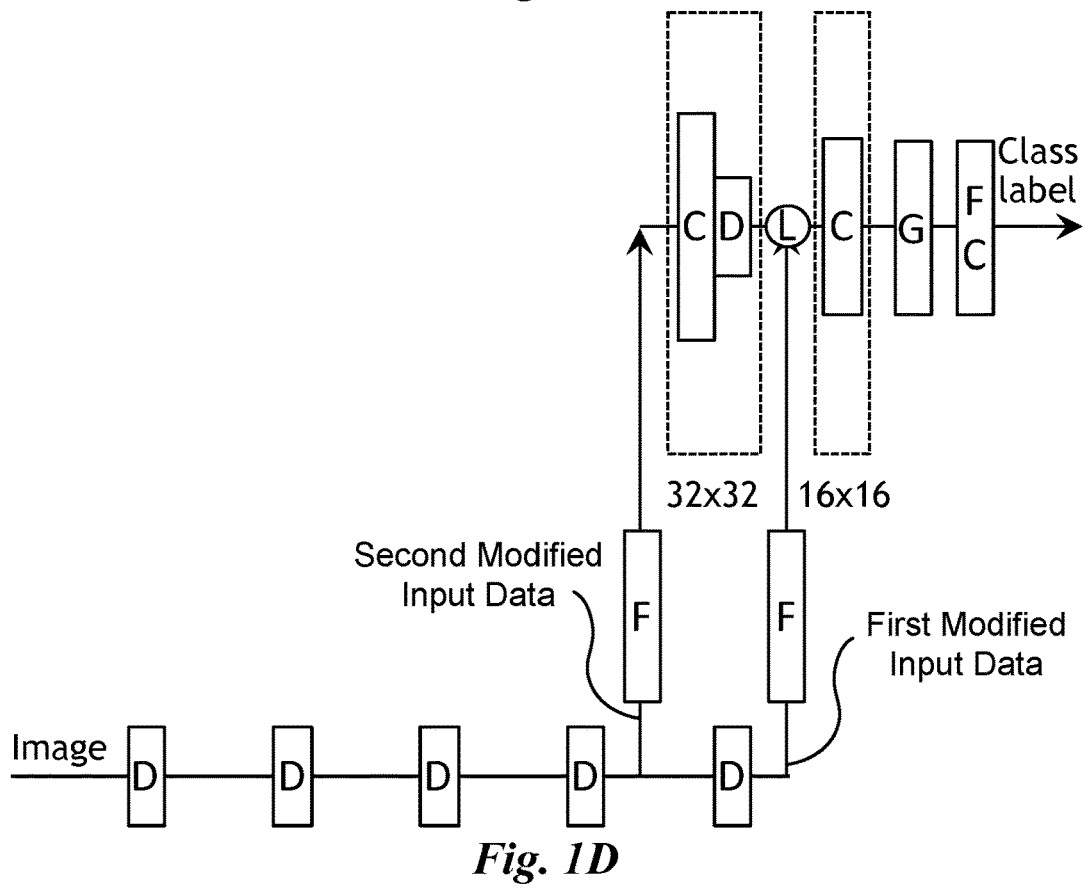
FIG. 1D illustrates another conceptual diagram of the image classifier neural network topology, progressively modified during training, in accordance with an embodiment.

FIG. 1D illustrates another conceptual diagram of the image classifier neural network topology, progressively modified during training, in accordance with an embodiment. After training is completed for the single convolutional layer topology shown in FIG. 1C, the topology of the neural network is modified to add a second layer. In an embodiment, for the second topology shown in FIG. 1D, the training input data is 512×512 pixel resolution image data that is downsampled to produce 32×32 pixel resolution image data images (second modified training input data). The second modified training input data is halved to produce 16×16 pixel resolution image data (first modified training input data).

The output of a 32×32 convolutional layer is downsampled by a downsampler (D) and input to the 16×16 convolutional layer (C) after passing through a linear interpolator (L). Before being input to the 32×32 convolutional layer of the neural network, the second modified training input data are convolved by a conversion layer (F) to convert the downsampled training input images into an abstract feature representation. In an embodiment, the first modified training input data and the second modified training input data comprise the converted downsampled 16×16 input images and the converted downsampled 32×32 input images, respectively.

At the start of training for the second topology, the linear interpolator provides the first modified training input data to the 16×16 convolutional layer. As training progresses, the linear interpolator begins to provide the output of the 32×32 layer to the 16×16 convolutional layer, increasingly providing the output of the 32×32 layer to smoothly transition from using the first modified training input data to using only the output of the 32×32 layer. Adjusting the linear interpolator to increasingly provide the output of the 32×32 layer instead of the first modified training input data smoothly modifies the topology of the image classifier neural network during a training duration.

Figure 1E:
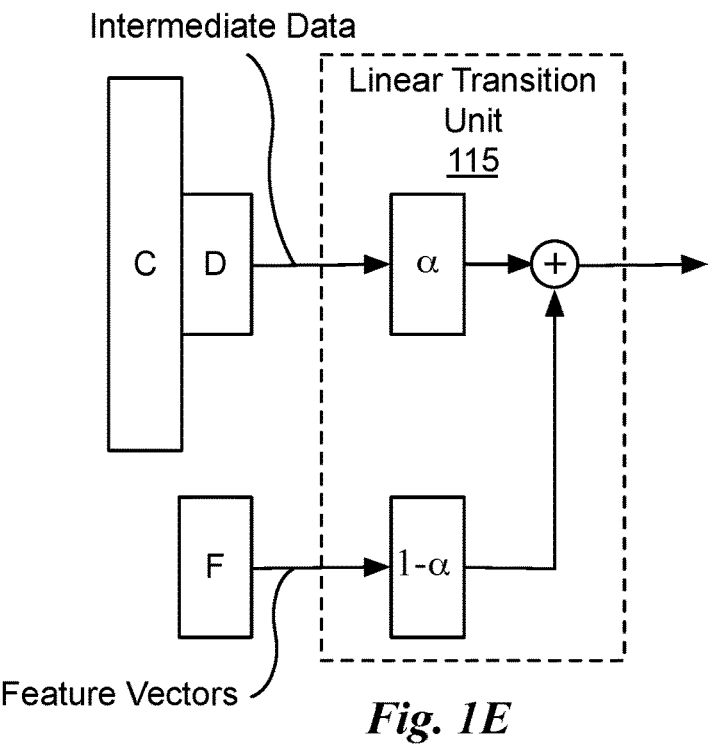
FIG. 1E illustrates a block diagram of a linear transition unit, in accordance with an embodiment.

FIG. 1E illustrates a block diagram of a linear transition unit 115, in accordance with an embodiment. In an embodiment, the linear transition unit 115 performs operation of the linear interpolator (L). During the transition from the first topology to the second topology, the layer that operates on the higher density data (e.g., the 32×32 layer) may be treated like a residual block, producing intermediate data that is scaled by a weight a that increases linearly from 0 to 1 during a second time duration.

As shown in FIG. 1E, the higher density intermediate data is scaled by a and intermediate data (feature vectors) for the lower density modified training input data corresponding to the first topology (output by the conversion layer) is scaled by 1-α. The scaled intermediate data and scaled feature vectors are summed by the linear transition unit 115 and input to the next layer (e.g., the 16×16 layer). In an embodiment, the summation supports inputs with different densities. During the topology transition, α is used by the linear transition unit 115 to interpolate between the intermediate data (feature vectors) corresponding to the first topology and the intermediate data corresponding to the second topology. When a reaches 1, the transition to the second topology shown in FIG. 1D is complete.

Figure 1F:
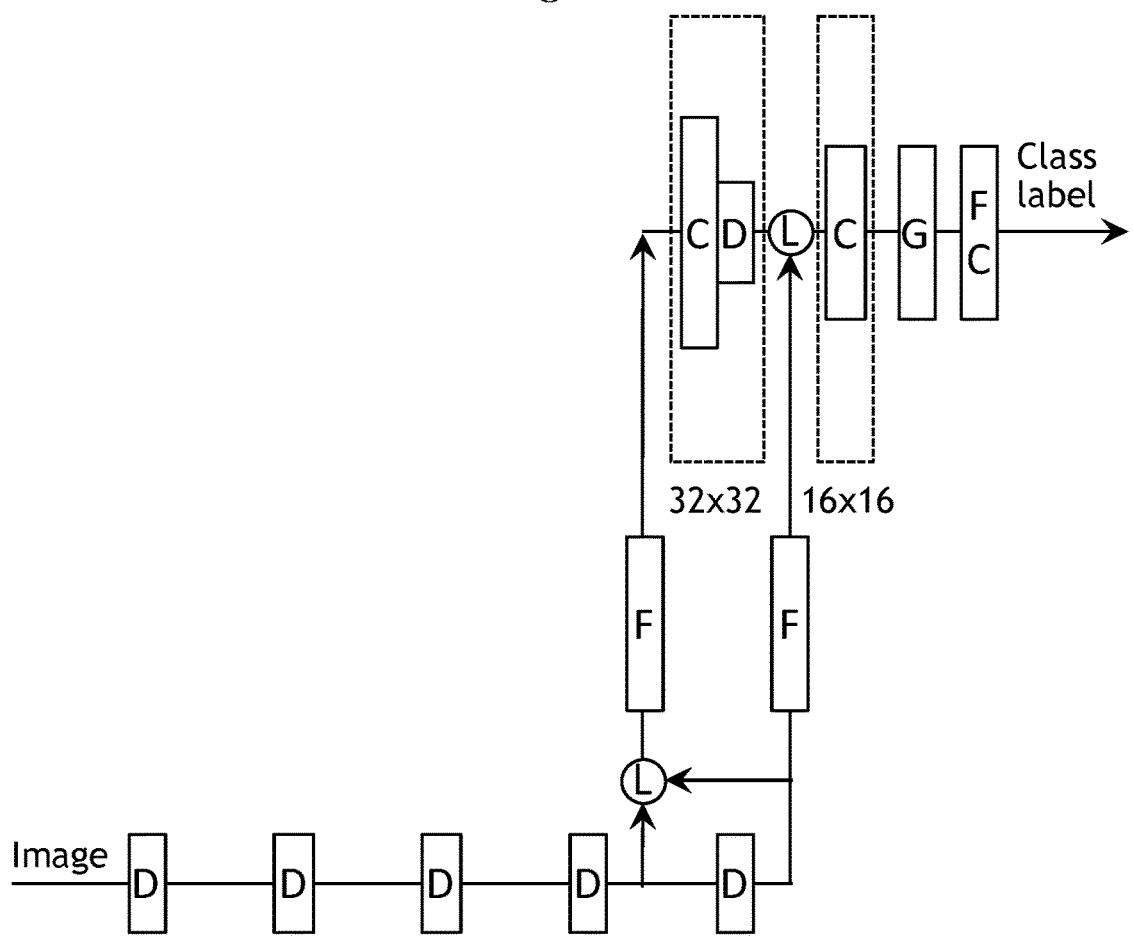
FIG. 1F illustrates another conceptual diagram of the image classifier neural network topology, progressively modified during training, in accordance with an embodiment.

FIG. 1F illustrates another conceptual diagram of the image classifier neural network topology, progressively modified during training, in accordance with an embodiment. Compared with the image classifier neural network for the second topology, shown in FIG. 1D, the image classifier neural network shown in FIG. 1F includes a second linear interpolator that is configured to linearly interpolate between the second modified training input data and the first modified training input data. During the topology transition, a is used by the second linear interpolator to interpolate between the 16×16 pixel resolution downsampled training input data corresponding to the first topology and the 32×32 pixel resolution downsampled training input data corresponding to the second topology, similarly to how the linear transition unit 115 blends the two topologies. In an embodiment, the second linear interpolator smoothly transitions the modified training input data from a lower resolution to a higher resolution as the topology is modified. In an embodiment (not shown), the second linear interpolator processes feature vectors instead of downsampled image data and is coupled between the output of the conversion layer (F) and the input to the 32×32 layer, also receiving the feature vectors output to the 16×16 layer by the conversion layer (F).

Smoothly transitioning the feature vectors that are input to the new layer added to the image classifier neural network topology encourages adjustment of the parameters for the new layer starting with the feature vectors for the lower resolution image data rather than immediately adjusting the parameters for the feature vectors for the higher resolution image data and ignoring influences of the lower resolution image data. The second linear interpolator may be implemented as the linear transition unit 115.

Figure 1G:
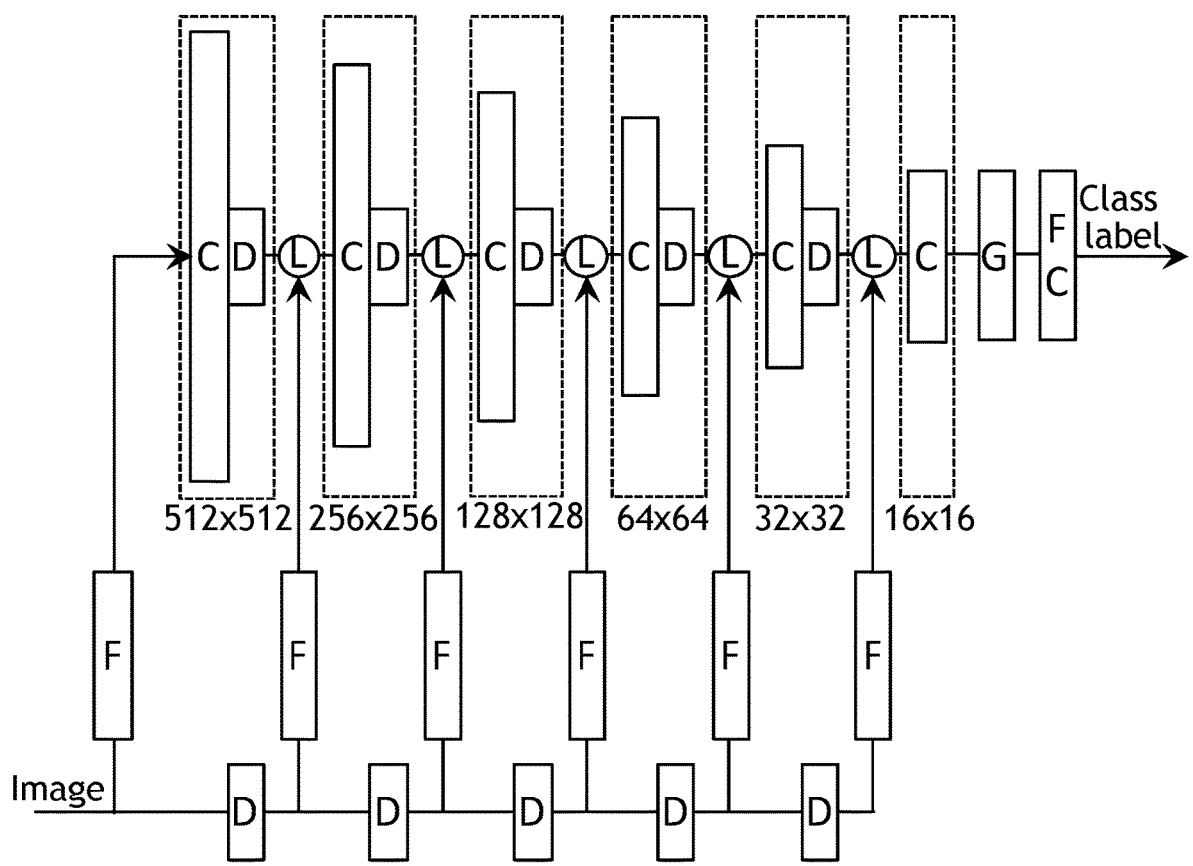
FIG. 1G illustrates another conceptual diagram of the image classifier neural network topology, progressively modified during training, in accordance with an embodiment.

FIG. 1G illustrates another conceptual diagram of the image classifier neural network topology, progressively modified during training, in accordance with an embodiment. During training, the topology of the image classifier neural network may be modified to add or remove layers, add or remove features (e.g. feature maps or neurons), add or remove connections between features, and the like. In an embodiment, modifications of the image classifier neural network topology change a processing capacity of the image classifier neural network. For example, one or more layers may be added, modifying the topology of image classifier neural network and increasing the processing capacity. As shown in FIG. 1G, layers are added to the image classifier neural network compared with the first topology shown in FIG. 1C and the second topologies shown in FIGS. 1D and 1F. Corresponding downsamplers and conversion layers are also added as the topology is modified.

Although the topology modifications are described in the context of the image classification, the topology modification may also be performed for other tasks. Modifications that remove layers may be performed, by reversing the order of the modifications shown in FIGS. 1C and 1D. In one embodiment, the training data includes additional training input data paired with the training output data, such as an image, a classification label, segmentation contours, and other types of data (distribution, audio, etc.) that is also processed by the image classifier neural network. In an embodiment, the additional training input data is interpolated for smooth transitions as the topologies are modified.

The parameters for all existing layers can be updated throughout the training process, meaning one or more weights for any layer of the neural network 110 may be updated during the training. The weight associated with each feature controls a contribution or impact that the feature has on the output of the layer. Rather than directly setting a value of each weight, the weights are learned during training. When the neural network 110 comprises the image classifier neural network, the training loss unit 105 updates the weight values of the image classifier neural network to reduce differences between the network output data produced by the image classifier neural network and the training output data.

Beginning training of the image classifier neural network with lower density training data provides stability for each topology of the image classifier neural network, even when the number of layers increases, to generate accurate class labels. Progressively modifying the topology during training also reduces training time compared with beginning training with all of the layers. A learning rate used by the training loss unit 105 may be increased, compared with conventional training techniques, while maintaining convergence to reduce training time.

When the training dataset includes high resolution training input images, the example images included in the training dataset are modified (downsampled) before being input to the image classifier neural network until the image classifier neural network is fully trained and a final topology is achieved. The final topology of the image classifier neural network may be predetermined and one or more layers are added or removed as the image classifier neural network is trained for each increment of training input data resolution (increasing or decreasing).

Although training of the neural network is described in the context of image classification, the neural network may be trained to generate the other output data using the progressive modification technique. Depending on the task, the network output data may be an image, audio, video, or other types of data (configuration setting). The resolution of the training data and/or processing capacity of the neural network is progressively modified as the topology is modified.

Figure 1H:
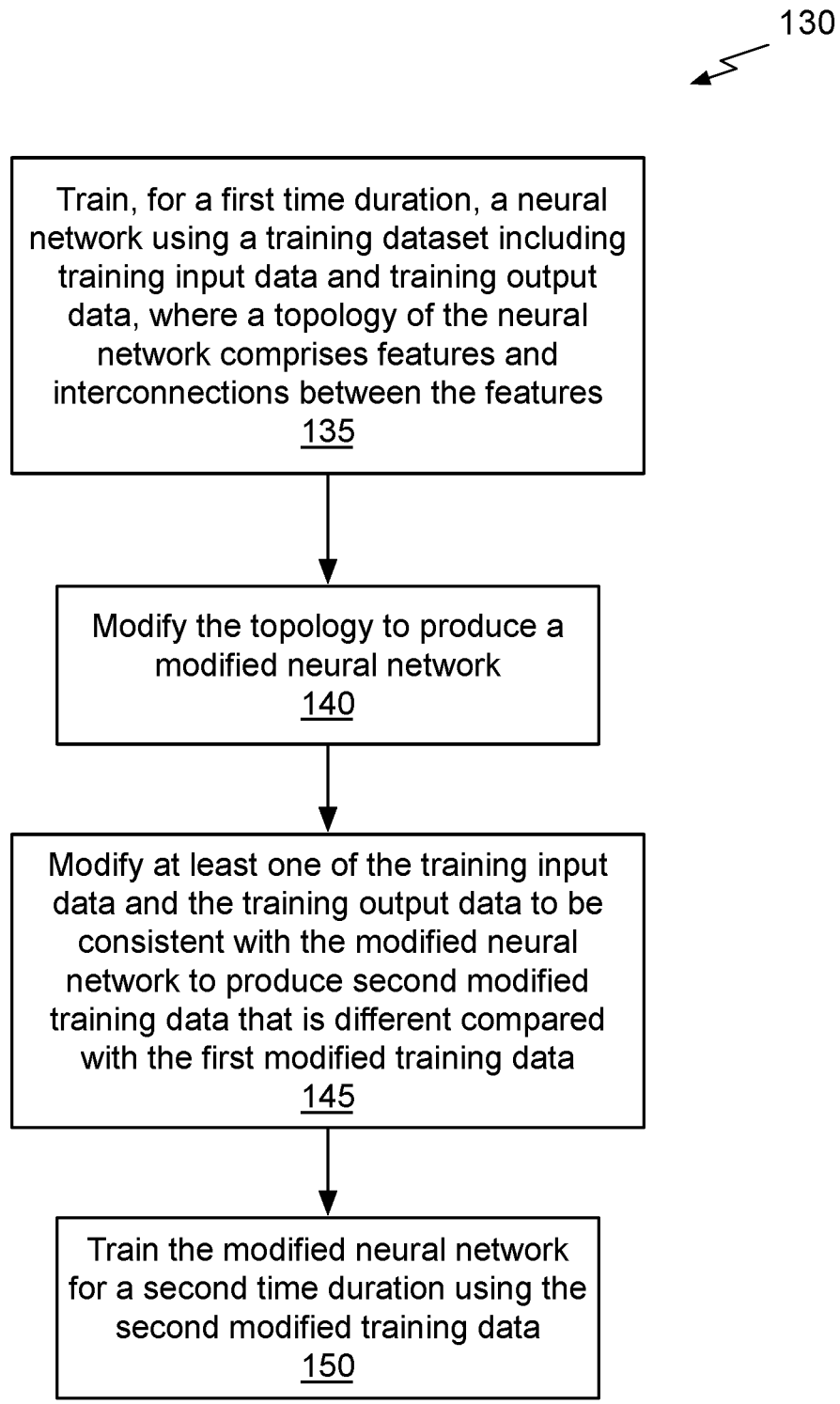
FIG. 1H illustrates a flowchart of a method for modifying the topology of a neural network during training, in accordance with an embodiment.

FIG. 1H illustrates a flowchart of a method for modifying the topology of the neural network 110 during training, in accordance with an embodiment. In an embodiment, the neural network 110 is an image classifier neural network. The method 130 may be performed by a program, custom circuitry, or by a combination of custom circuitry and a program. For example, the method 130 may be executed by a GPU (graphics processing unit), CPU (central processing unit), or any processor capable of performing the operations of the neural network 110. Furthermore, persons of ordinary skill in the art will understand that any system that performs method 130 is within the scope and spirit of embodiments of the present invention.

At step 135, the neural network 110 is trained for a first time duration using a training dataset, where a topology of the neural network 110 comprises features and interconnections between the features within the neural network 110. In an embodiment, the neural network 110 processes image data. In an embodiment, the neural network 110 processes audio data. In an embodiment, the training dataset includes training input data and training output data, and, during training, the neural network 110 processes the training input data to produce network output data.

Figure 1I:
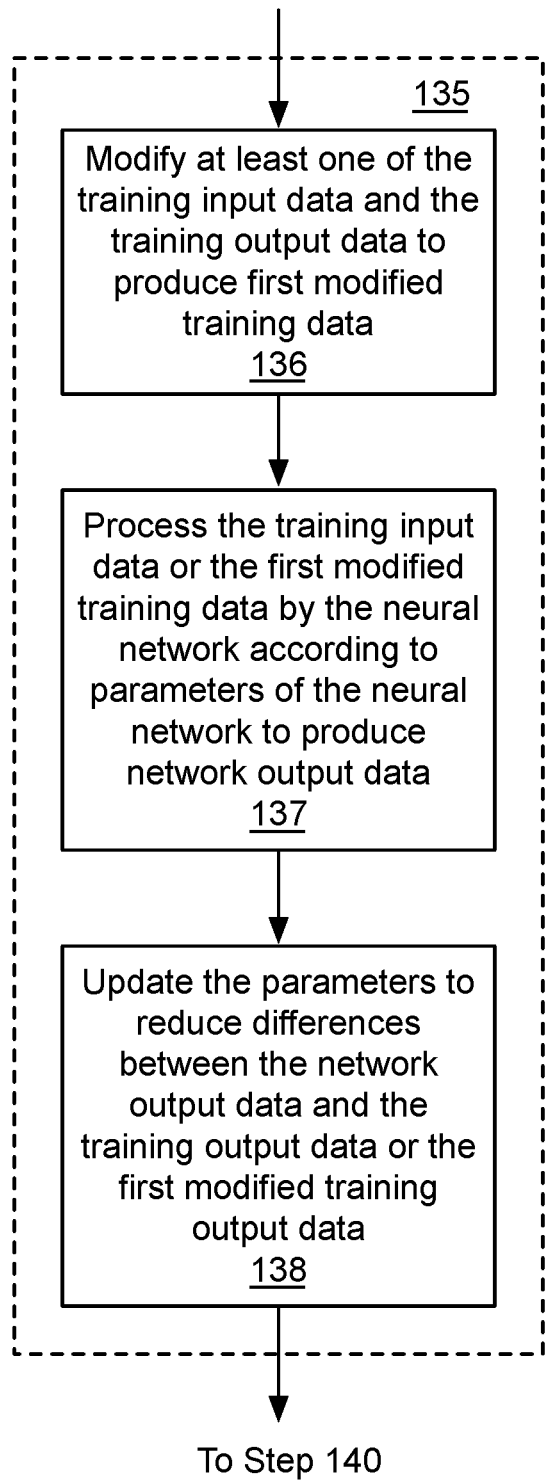
FIG. 1I illustrates a flowchart of a step shown in FIG. 1H, in accordance with an embodiment.

FIG. 1I illustrates a flowchart of step 135 shown in FIG. 1H, in accordance with an embodiment. At step 136, at least one of the training input data and the training output data are modified to produce first modified training data. At step 137, the neural network 110 processes the training input data or the first modified training data according to parameters of the neural network 110 to produce network output data. The training loss unit 105 receives the training output data and the network output data produced by the neural network 110 and produces updated parameters for the neural network 110. At step 138, the parameters are updated to reduce differences between the network output data and the training output data or, when the training output data is modified, to reduce differences between the network output data and the first modified training output data.

In an embodiment, modifying the topology of the neural network 110 comprises increasing or decreasing a density of the network output data. In an embodiment, modifying the training data comprises increasing or decreasing a density of the training output data. In an embodiment, modifying the training data comprises increasing or decreasing a density of the training input data. For example, a spatial resolution of the training input data and/or the training output data may be decreased. In an embodiment, the modifications to the training data are task-specific. In one embodiment, the training data includes additional training input data, such as an image, a classification label, segmentation contours, and other types of data (distribution, audio, etc.), and the additional training input data are paired with the training output data. In an embodiment, during the first time duration, the first modified training input data is input to the neural network 110 to produce the network output data.

As shown in FIG. 1H, at step 140, the topology of the neural network 110 is modified to produce a modified neural network 110. In an embodiment, modifying the topology changes a processing capacity of the neural network 110. For example, in an embodiment, the topology is modified by adding one or more layers (e.g. fully-connected layer, convolutional layer, upsampling, pooling, normalization, capsule, and the like), adding or removing features (e.g. feature maps, neurons, activations, and the like), adding or removing connections between features, and the like, in the neural network 110. In an embodiment, the modifications to the neural network 110 are task-specific. For a different task, the topology may be modified by removing one or more layers, adding or removing features, adding or removing connections between features, and the like, in the neural network 110.

At step 145, at least one of the training input data and the training output data are modified to be consistent with the modified neural network 110 to produce second modified training data that is different compared with the first modified training data. In an embodiment, the training input data is modified to produce second modified training input data for input to the neural network 110. In an embodiment, the modified training data for the first time duration is modified according to a first function and the modified training data for the second time duration is modified according to a second function that is different than the first function. In an embodiment, the training data is image data and an amount by which the pixel resolution of at least one of the training input data and the training output data is decreased for the first time duration is greater compared with the second time duration.

At step 150, the modified neural network 110 is trained for a second time duration using the second modified training data. The training loss unit 105 receives the training output data and the network output data produced by the modified neural network 110 and produces updated parameters for the modified neural network 110.

Figure 2A:
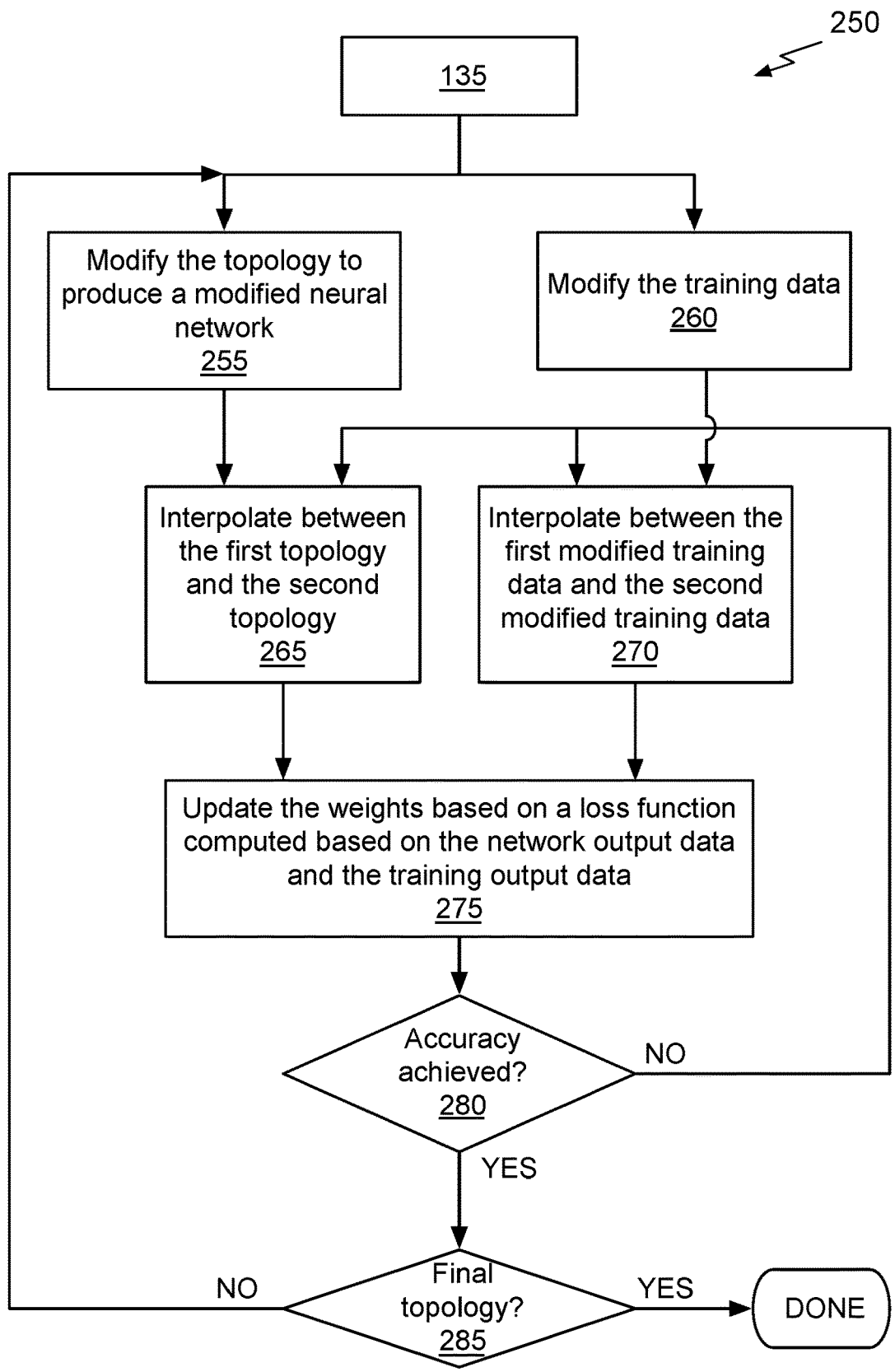
FIG. 2A illustrates a flowchart of a method for smoothly modifying the topology of a neural network during training, in accordance with an embodiment.

FIG. 2A illustrates a flowchart of a method 250 for smoothly modifying the topology of a neural network during training, in accordance with an embodiment. The method 250 may be performed by a program, custom circuitry, or by a combination of custom circuitry and a program. For example, the method 250 may be executed by a GPU (graphics processing unit), CPU (central processing unit), or any processor capable of performing the neural network operations. Furthermore, persons of ordinary skill in the art will understand that any system that performs method 250 is within the scope and spirit of embodiments of the present invention.

At step 135, the neural network 110 is trained for a first time duration using a topology. At step 255, the topology of the neural network 110 is modified to produce a modified neural network 110. At step 260, the training data is modified to produce modified training data. For example, the training data may be downsampled or upsampled. Modifying the training data comprises modifying at least one of the training input data and the training output data. Steps 255 and 260 may be performed in parallel (as shown in FIG. 2A) or sequentially.

At step 265, when training the neural network 110 for a second time duration, the neural network 110 is configured to interpolate between the first topology and the second topology. At step 270, when training neural network 110 for the second time duration, interpolation is performed between the first modified training data and the second modified training data. Steps 265 and 270 may be performed in parallel (as shown in FIG. 2A) or sequentially.

At step 275, when training the neural network 110 for the second time duration, the weights of the neural network 110 are updated based on a loss function computed using the network output data. In an embodiment, the training loss unit 105 updates the weights according to a learning rate. At step 280, the training loss unit 105 determines if a level of accuracy is achieved, and, if not, the training continues at steps 265 and 270. The level of accuracy may be a predetermined threshold value (i.e., criterion). In an embodiment, the level of accuracy may be deemed sufficient after a predetermined number of training steps has been performed or a predetermined amount of time has elapsed. In an embodiment, as the accuracy increases, the value of $\alpha$ controlling the smooth transition from the first topology to the second topology may also increase. Alternatively, a predetermined quantity of the training data may be used to train the neural network 110 for each increment of $\alpha$.

When the level of accuracy is achieved at step 280, then at step 285 a determination is made whether the neural network 110 matches the final topology. If so, the training is complete. Otherwise, steps 255, 260, 265, 270, 275, and 280 are repeated and the neural network 110 is modified to transition to another topology and training continues. For example, in an embodiment, the topology is further modified by adding one or more layers, adding or removing features, adding or removing connections between features, and the like, in the neural network 110.

Figure 2B:
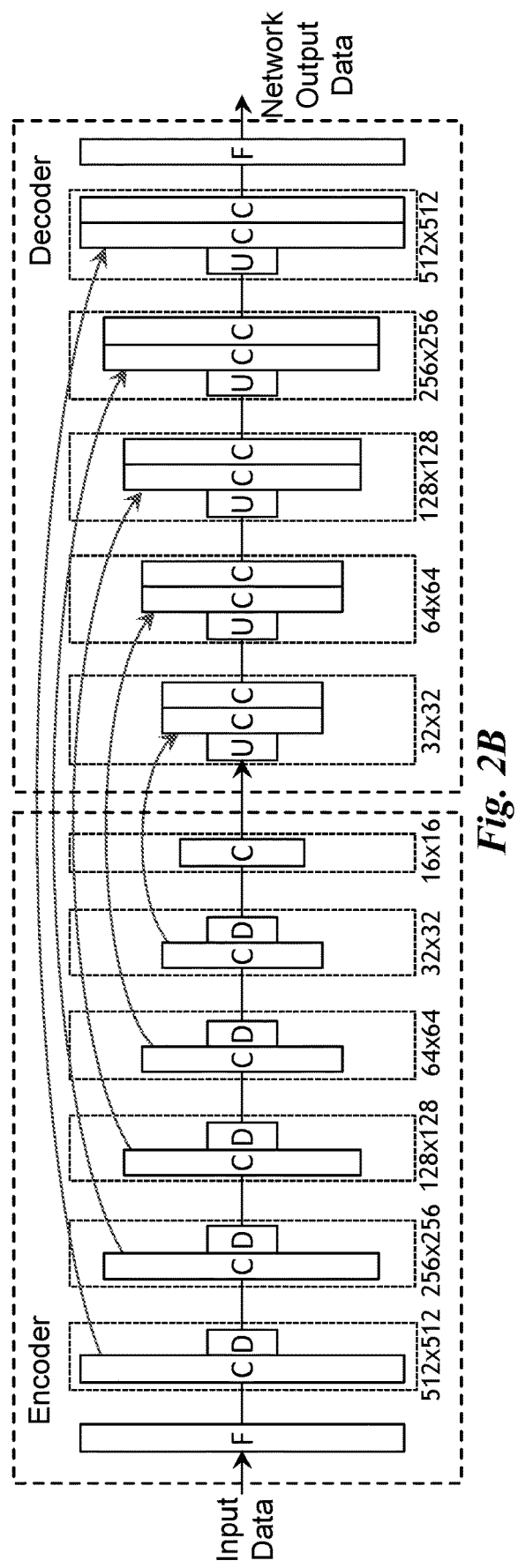
FIG. 2B illustrates a block diagram of a U-net neural network topology, in accordance with an embodiment.

FIG. 2B illustrates a block diagram of a U-net neural network topology, in accordance with an embodiment. In an embodiment, the neural network 110 shown in FIG. 1A comprises a U-net neural network. In an embodiment, the U-net neural network is trained to denoise images, processing corrupted image data to generate clean image data. Although training of the U-net neural network is described in the context of image processing, the U-net neural network may be trained to generate other output data using the progressive modification technique. Depending on the task, the network output data may be a class label, per-pixel class label, per-region object class, object bounding boxes, confidence value, audio data, or video data.

The U-net neural network includes multiple layers, where a conversion layer (F) converts the input data (corrupted image data) into multiple channels of features. As shown in FIG. 2B, a 512×512 layer includes a convolutional layer (C) followed by a downsampler (D). The 256×256 resolution intermediate data output by the 512×512 layer is processed, according to the parameters of the U-net neural network by a 256×256 layer, then a 128×128 layer, a 64×64 layer, a 32×32 layer, and a 16×16 layer that generates a compressed encoding of the image data. The compressed encoding of the image data is input to a 32×32 layer including an upsampler (U) followed by two convolutional layers (C). The intermediate data output by the 32×32 layer is processed, according to the parameters of the U-net neural network by a 64×64 layer, then a 128×128 layer, a 256×256 layer, and a 512×512 layer that a feature representation of the network output data (clean image data). A conversion layer (F) converts the feature representation into the output data.

In an embodiment, the U-net neural network comprises an encoder portion and a decoder portion, where the encoder portion comprises layers that each include a downsampler and the decoder portion comprises layers that each include a upsampler. Each encoder layer or group of layers for a particular density or resolution provides some additional intermediate data to the corresponding decoder layer or group of layers for the same density or resolution via a skip connection. In an embodiment, the U-net neural network performs semantic segmentation. In an embodiment, the skip connections are omitted and the resulting neural network comprises a standard autoencoder.

During training, the topology of the U-net neural network is modified to add or remove layers, add or remove features (e.g. feature maps or neurons), add or remove connections between features, and the like. During training, both encoder portion and the decoder portion are progressively modified, transitioning from one topology to another. In an embodiment, layer pairs are added or removed during training, where each layer pair includes one layer in the encoder and one layer in the decoder that process data of the same density. In an embodiment, modifications of the U-net neural network topology change a processing capacity of the U-net neural network. In an embodiment, the modifications are introduced smoothly by interpolating between the old and new topology and the old and new training data.

Figure 2C:
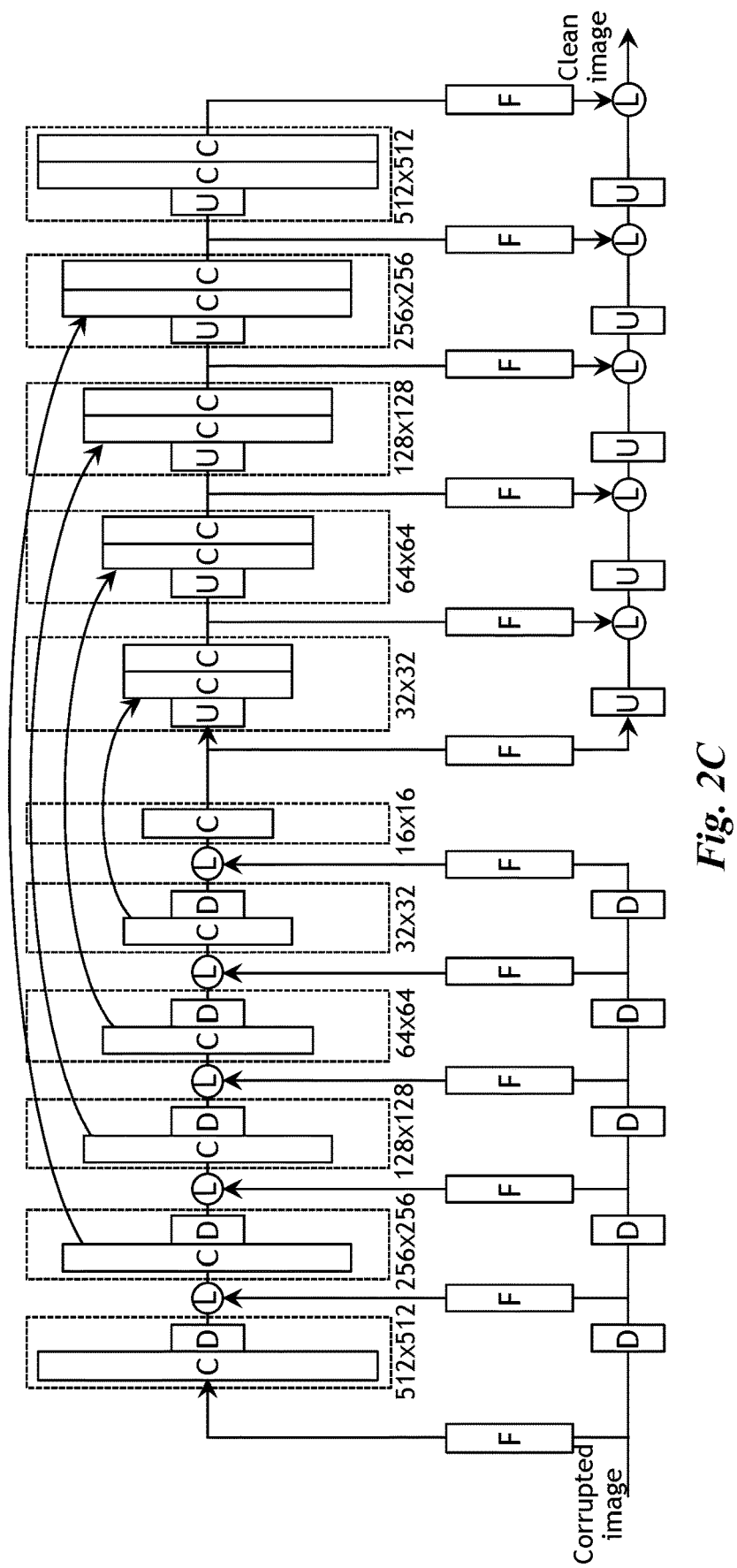
FIG. 2C illustrates a conceptual diagram of the U-net neural network topology for training with progressive topology modifications, in accordance with an embodiment.

FIG. 2C illustrates a conceptual diagram of the U-net neural network topology for training with progressive topology modifications, in accordance with an embodiment. Compared with the U-net neural network in FIG. 2B, in FIG. 2C, each layer or group of layers of the U-net neural network is augmented with a conversion layer (F), a linear interpolator (L), and either a downsampler or upsampler.

The parameters for all existing layers can be updated throughout the training process, meaning one or more weights for any layer of the neural network 110 may be updated during the training. The weight associated with each feature controls a contribution or impact that the feature has on the output of the layer and the weights are learned during training. When the neural network 110 comprises the U-net neural network, the training loss unit 105 updates the weight values of the U-net neural network to reduce differences between the network output data produced by the U-net neural network and the training output data.

Figure 2D:
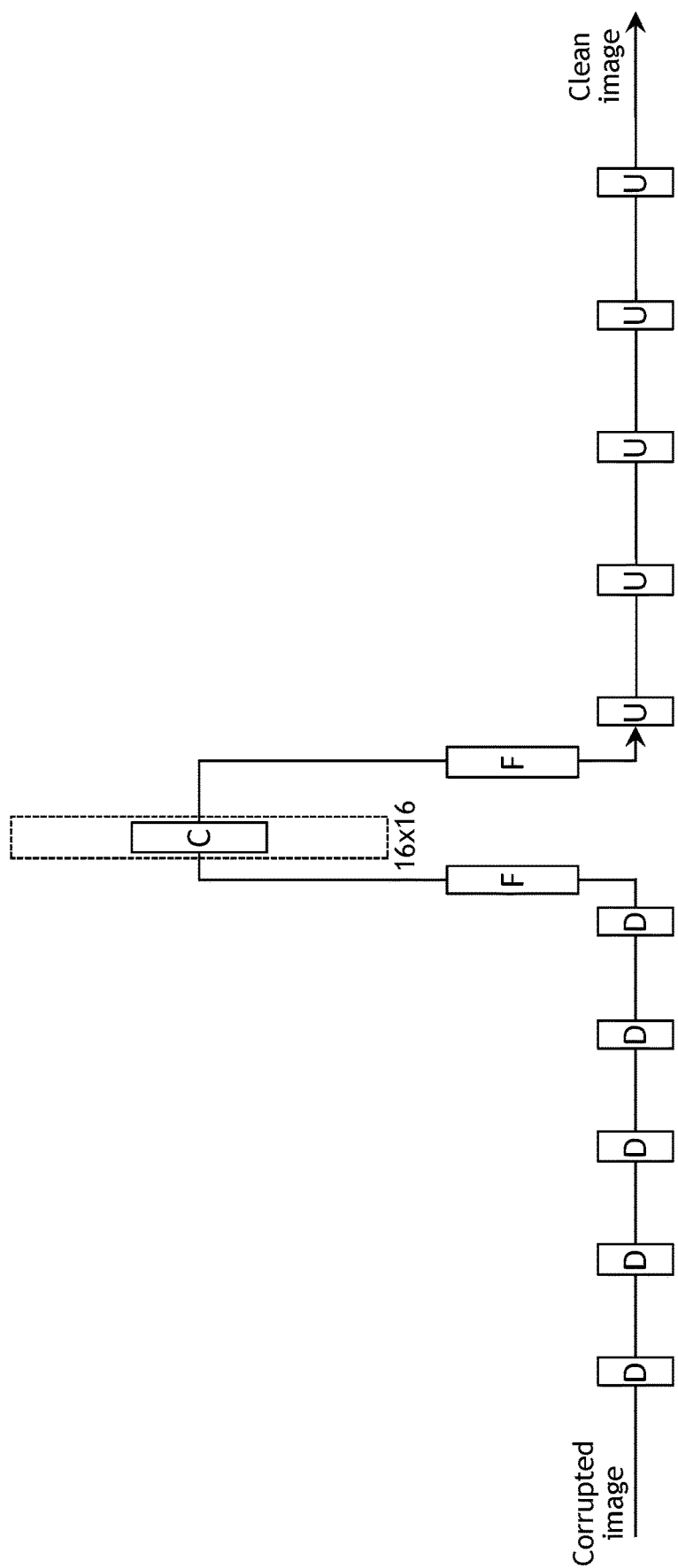
FIG. 2D illustrates another conceptual diagram of the U-net neural network topology, progressively modified during training, in accordance with an embodiment.

FIG. 2D illustrates another conceptual diagram of the U-net neural network topology modifications during training, in accordance with an embodiment. Training of the U-net neural network may begin with a single layer at the lowest density (16×16). The resolution of the training input data included in the training data may be decreased to match the spatial resolution of the network output images generated by the U-net neural network using one or more downsamplers (D). A conversion layer (F) included in the encoder portion of the U-net neural network projects the input data to feature vectors. When the encoder portion of the U-net neural network is trained for an image processing task, the conversion layer projects the input image data to feature vectors.

A conversion layer (F) in the decoder portion of the U-net neural network projects feature vectors generated by the single convolutional layer (C) to the output data format. For example, when the U-net neural network is trained for an image generation task, the conversion layer projects feature vectors to RGB colors, producing an output image. In an embodiment, the conversion layers perform 1×1 convolutions. The resolution of the output data generated by the 16×16 layer of the U-net neural network may be increased to match the spatial resolution of the training output images using one or more upsamplers (U). Alternatively, the resolution of the output training data may be decreased, using one or more downsamplers (D), to match the spatial resolution of the network output images generated by the 16×16 layer of the U-net neural network. As the training progresses, the topology of the U-net neural network may be modified by increasing the number of layers and modifying the resolution of the training data and/or the intermediate data output by the decoder portion.

Figure 2E:
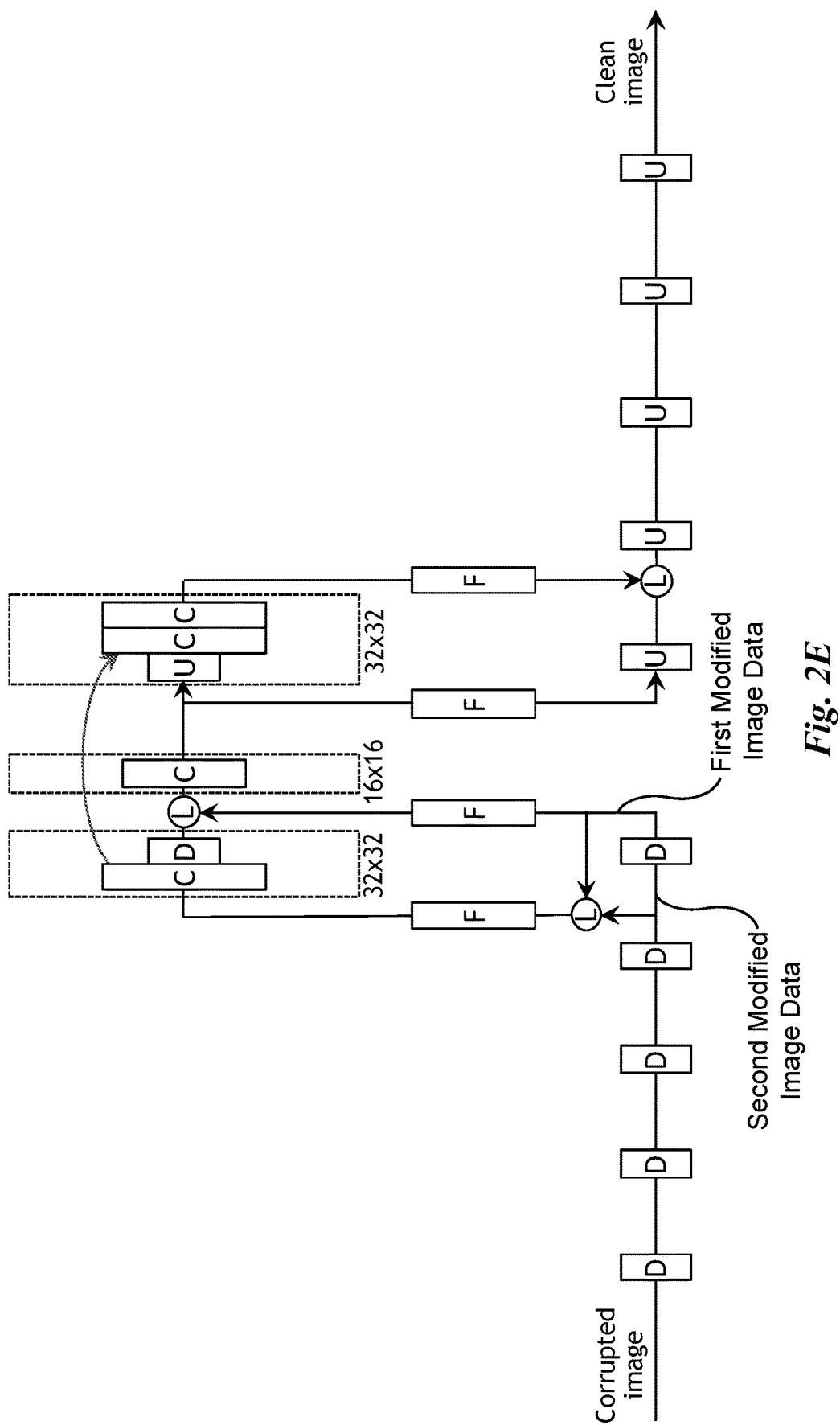
FIG. 2E illustrates another conceptual diagram of the U-net neural network topology, progressively modified during training, in accordance with an embodiment.

FIG. 2E illustrates another conceptual diagram of the U-net neural network topology modifications during training, in accordance with an embodiment. As shown in FIG. 2E, layers are added to the U-net neural network compared with the first topology shown in FIG. 2D, resulting in a second topology. Corresponding conversion layers, linear interpolators, downsamplers, and upsamplers are also added as the topology is modified.

The 32×32 layers are added to the encoder and decoder portions of the U-net neural network, increasing the spatial resolution of the processed training input data and generated network output data. In an embodiment, the 32×32 layer in the encoder includes a downsampler (D) and one 3×3 convolutional layer (C). In an embodiment, the 32×32 layer in the decoder includes an upsampler (U) and two 3×3 convolutional layers (C).

In an embodiment, the modifications to the topology are introduced smoothly by interpolating between the old and new topology and the old and new modified training data. The U-net neural network may be configured to smoothly modify the topology using the linear interpolators (L). Within the encoder, the output of a 32×32 convolutional layer is downsampled by a downsampler (D), generating intermediate data that is input to the 16×16 convolutional layer (C) after passing through a linear interpolator (L). At the start of training for the second topology, the linear interpolator provides the first modified training input data (feature vectors) to the 16×16 convolutional layer. As training progresses, the linear interpolator begins to provide the higher-density intermediate data output by the 32×32 layer to the 16×16 convolutional layer, increasingly providing the output of the 32×32 layer to smoothly transition from using the first modified training input data to using only the output of the 32×32 layer. Adjusting the linear interpolator to increasingly provide the output of the 32×32 layer instead of the first modified training input data smoothly modifies the topology of the neural network during a training duration.

For the decoder, the linear interpolator is coupled between the conversion layer for the 32×32 layer and an upsampler to receive the converted intermediate data output by the 32×32 layer and the upsampled intermediate data output by the 16×16 layer. At the start of training for the second topology, the linear interpolator in the decoder provides the intermediate data from the 16×16 convolutional layer to the upsamplers that generate the network output data. As training progresses, the linear interpolator begins to provide the output of the 32×32 layer to the upsamplers that generate the network output data, increasingly providing the output of the 32×32 layer to smoothly transition from the first topology to the second topology. Adjusting the linear interpolator to increasingly provide the intermediate data output by the 32×32 layer instead of the intermediate data from the 16×16 convolutional layer smoothly modifies the topology of the neural network during a training duration.

Similar to the image classifier neural network described in conjunction with FIG. 1F, the U-net neural network may be configured to smoothly modify the modified training data to smoothly transition from first modified training data to second modified training data. Smoothing the transitions of the training data reduces sudden shocks to the already well-trained, neural network 110 having a first topology. For example, the first topology having a low capacity layer may be well-trained, so a second topology with additional layers is gradually introduced during training as the training data is correspondingly gradually modified for the second topology.

To smoothly transition the training input data (corrupted image data), a second linear interpolator is configured in the encoder to linearly interpolate between the second modified image data and the first modified image data. During the topology transition, a is used by the second linear interpolator to interpolate between the 16×16 pixel resolution downsampled training input data corresponding to the first topology and the 32×32 pixel resolution downsampled training input data corresponding to the second topology, similarly to how the first linear interpolator blends the two topologies. In an embodiment, the second linear interpolator smoothly transitions the training input data from a lower resolution to a higher resolution as the topology is modified. In an embodiment (not shown), the second linear interpolator processes feature vectors instead of downsampled image data and is coupled between the output of the conversion layer (F) and the input to the 32×32 layer, receiving the feature vectors output to the 16×16 layer by the conversion layer (F).

Figure 2F:
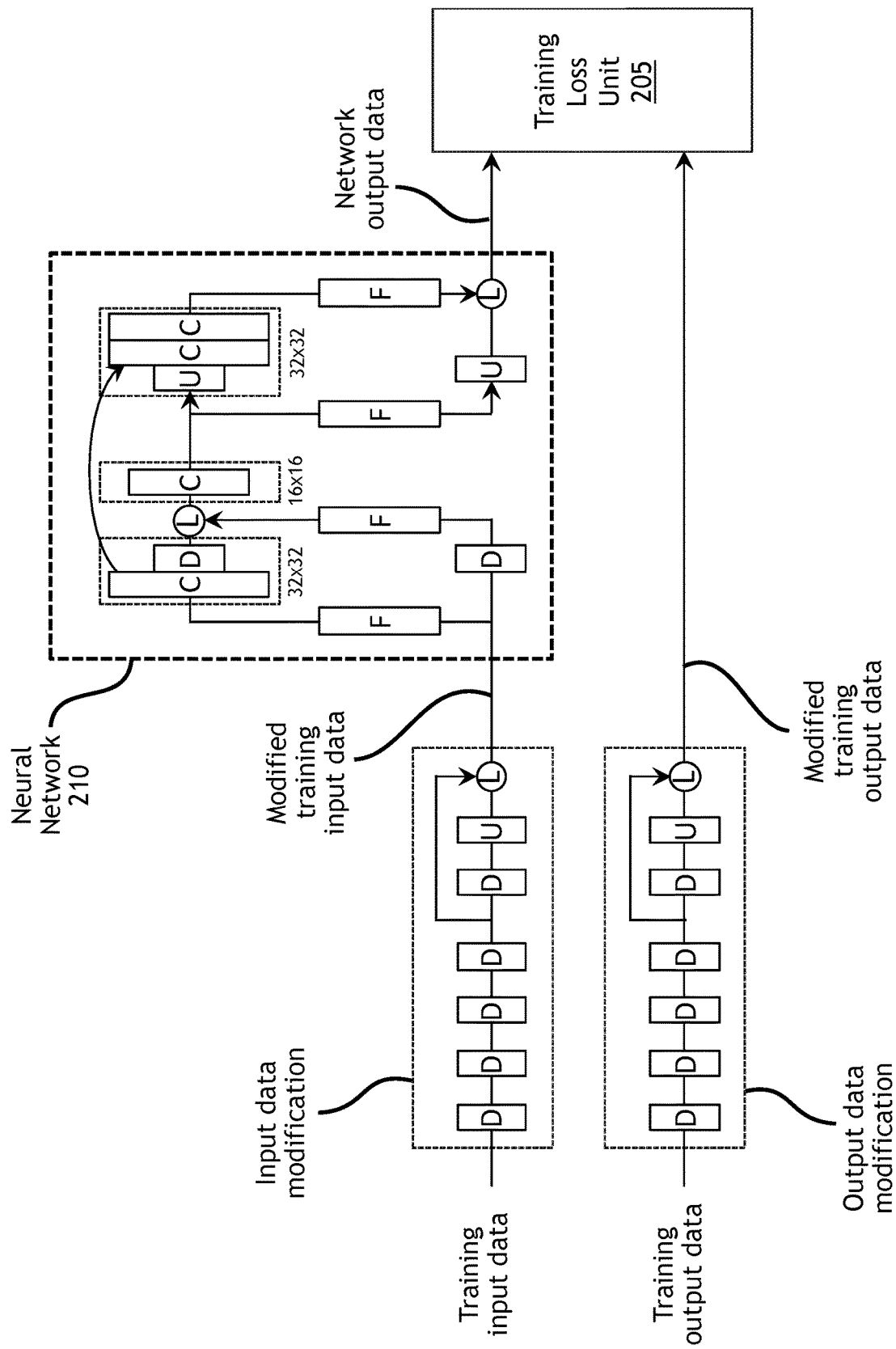
FIG. 2F illustrates a diagram of another neural network system, in accordance with an embodiment.

FIG. 2F illustrates a diagram of another neural network system, in accordance with an embodiment. The neural network system may be implemented by a program, custom circuitry, or by a combination of custom circuitry and a program. For example, the neural network system may be implemented using a GPU (graphics processing unit), CPU (central processing unit), or any processor capable of performing the operations described herein. Furthermore, persons of ordinary skill in the art will understand that any system that performs the operations of the neural network system is within the scope and spirit of embodiments of the present invention.

The neural network system includes a neural network 210 and a training loss unit 205. Topologies of the neural network 210 may be modified during training. The neural network 210 may be configured as an autoencoder, a U-net, a recurrent U-net, classifier, or the like. The neural network 210 may be configured to perform semantic segmentation, object detection, classification, image de-noising, video de-noising, or other tasks. The neural network 210 receives input data and produces network output data.

As shown in FIG. 2F, both the training input data and the training output data may be modified during the training. Similar to the progressively modified neural network shown in FIG. 2E, the training input data is modified by interpolating between 16×16 pixel resolution downsampled training input data and 32×32 pixel resolution training input data. The interpolation is done according to α to obtain a 32×32 pixel resolution modified training input data that is then processed by the neural network. Different from FIG. 2E, the training output data is also modified the same way as the training input data to obtain a 32×32 pixel resolution modified training output data. The neural network 210 is configured to produce the network output data at 32×32 pixel resolution, instead of upsampling the output data to 512×512 pixel resolution. Furthermore, the training loss unit 205 is configured to compare the network output data and the training output data directly at 32×32 resolution. The embodiment illustrated in FIG. 2F may offer two benefits compared to the one illustrated in FIG. 2E. First, the training may be performed more efficiently, because the neural network 210 and the training loss unit 205 are concerned with smaller 32×32 pixel resolution images instead of 512×512. Second, interpolating the training output data between two pixel resolutions during the transition may stabilize the training the same way as interpolating the training input data does. A person skilled in the art will appreciate that FIGS. 2E and 2F illustrate two exemplary embodiments of modifying the training input data and the training output data. In other embodiments, the upsampling, downsampling, and interpolation operations may be configured in different ways to yield similar benefits.

Figure 2G:
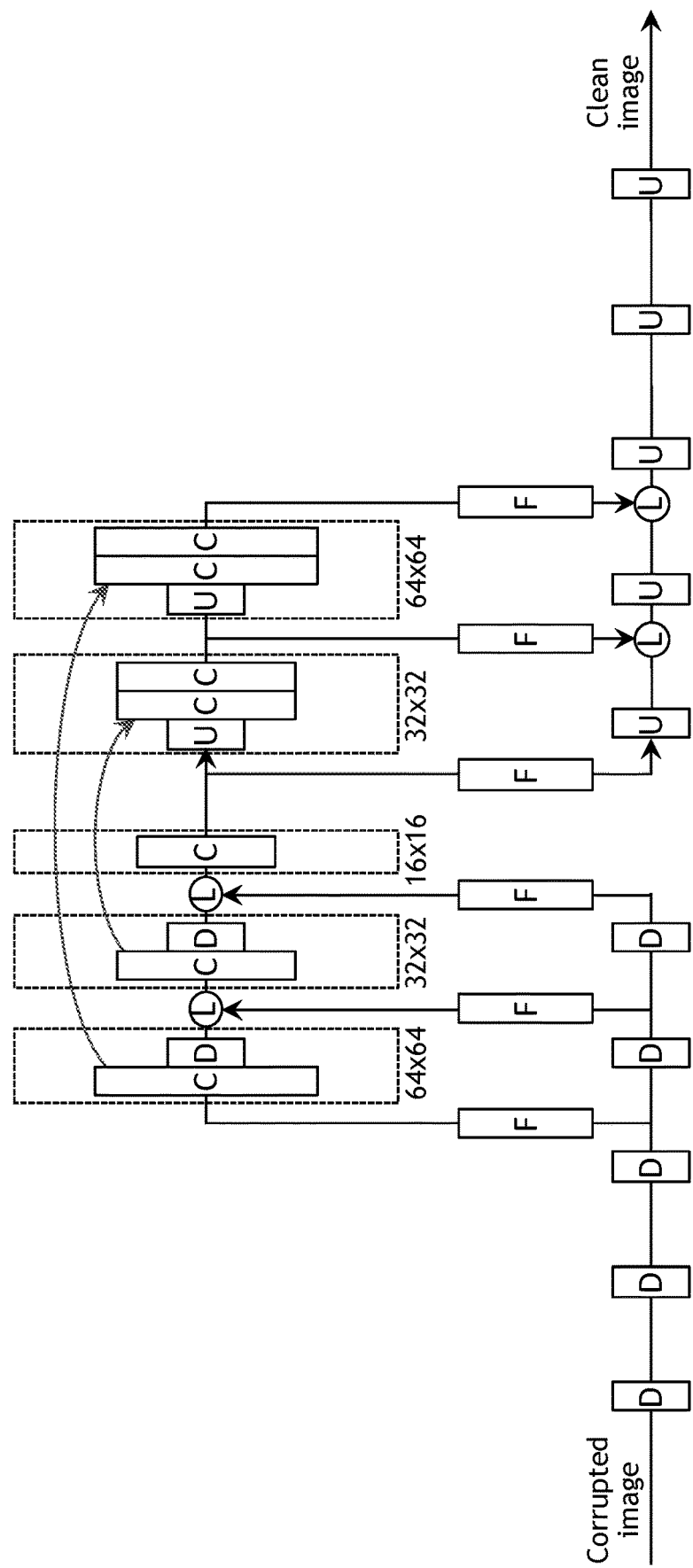
FIG. 2G illustrates another conceptual diagram of the U-net neural network topology, progressively modified during training, in accordance with an embodiment.

FIG. 2G illustrates another conceptual diagram of the U-net neural network topology modifications during training, in accordance with an embodiment. As the training progresses even further, the topology of the U-net neural network is modified by adding progressively more layers, including the 64×64 layers, increasing the spatial resolution of the generated output images. Corresponding conversion layers, linear interpolators, downsamplers, and upsamplers are also added as the topology is modified. Linear interpolators may also be included (not shown) for smoothly transitioning the training data.

Figure 2H:
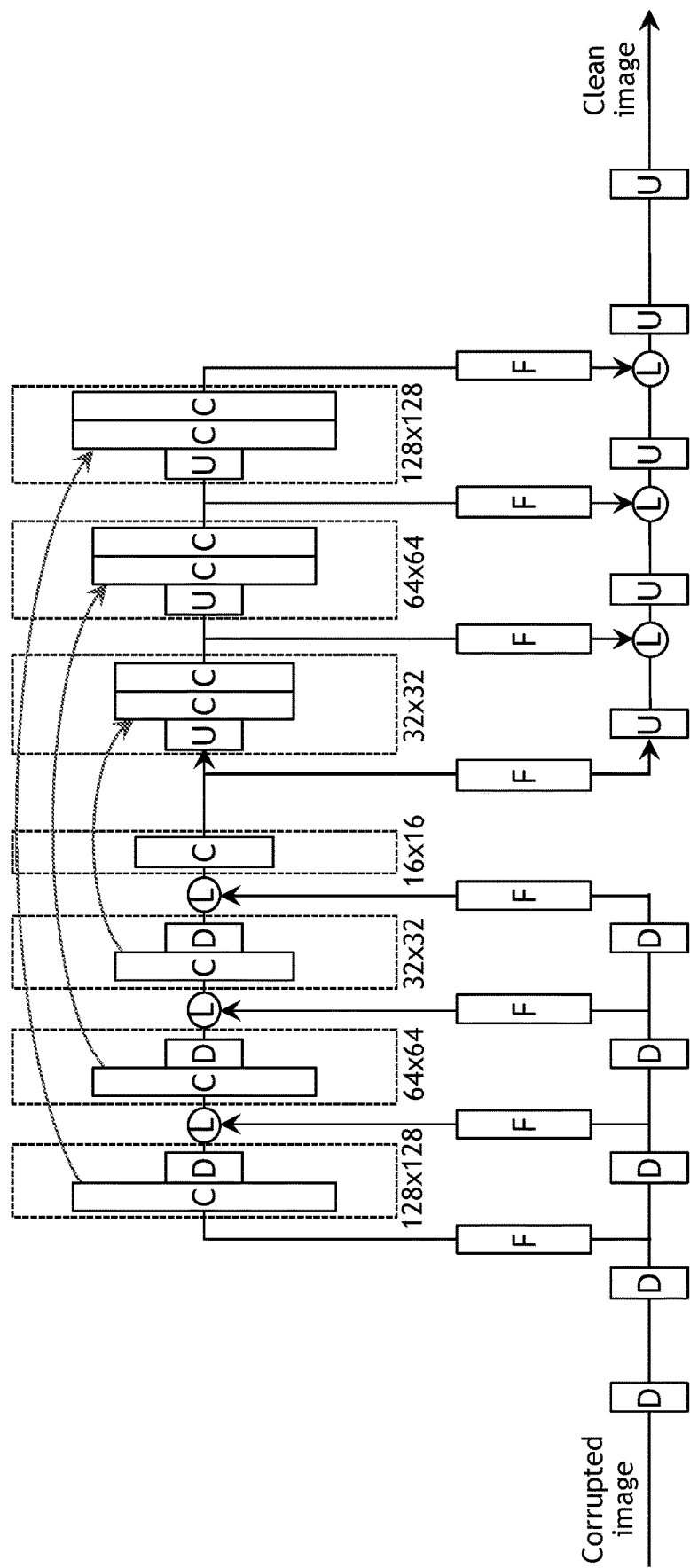
FIG. 2H illustrates another conceptual diagram of the U-net neural network topology, progressively modified during training, in accordance with an embodiment.

FIG. 2H illustrates another conceptual diagram of the U-net neural network topology modifications during training, in accordance with an embodiment. When training is completed for the topology shown in FIG. 2G, the topology of the U-net neural network is further modified to include the 128×128 layers. Corresponding conversion layers, linear interpolators, downsamplers, and upsamplers are also added as the topology is modified. Note that the skip connections are added for each new pair of layers or groups of layers.

Figure 2I:
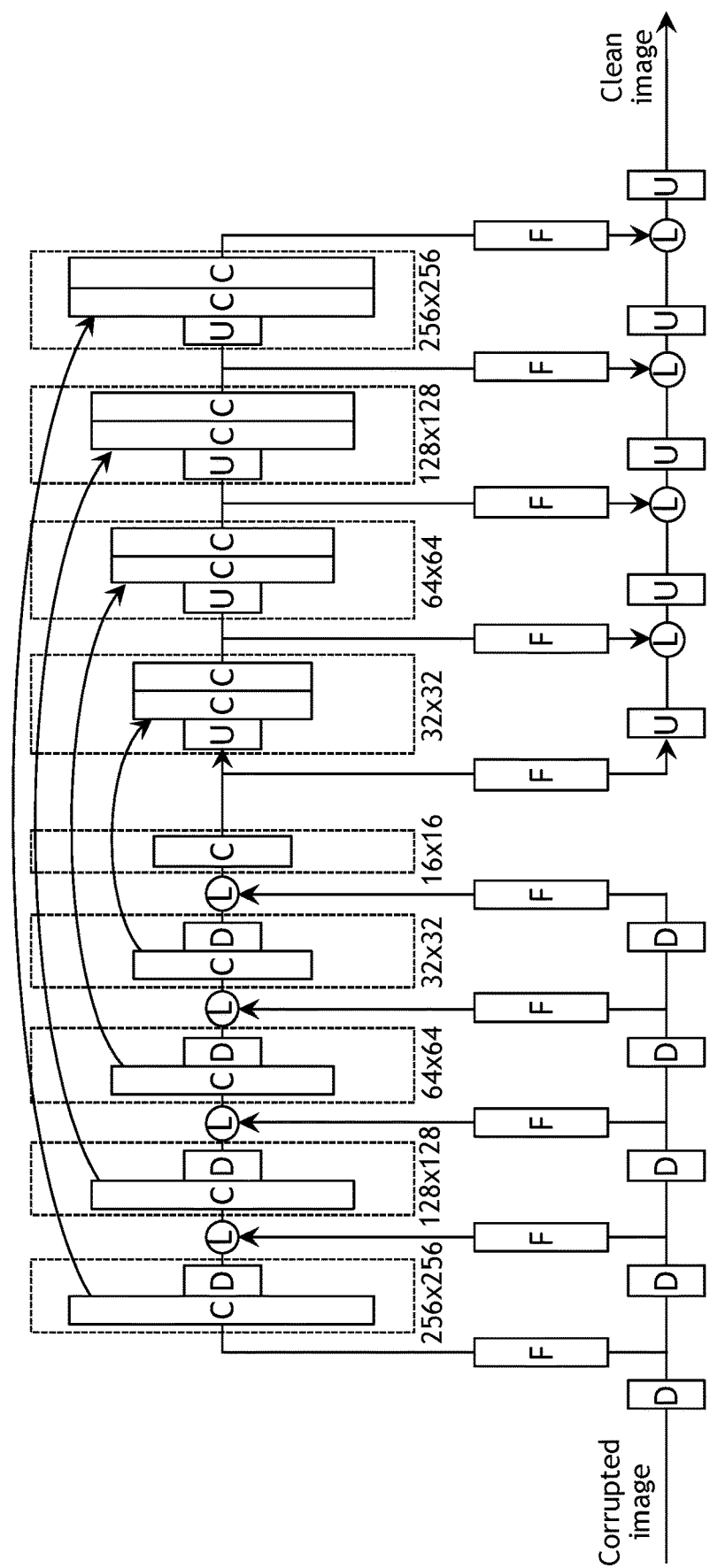
FIG. 2I illustrates another conceptual diagram of the U-net neural network topology, progressively modified during training, in accordance with an embodiment.

FIG. 2I illustrates another conceptual diagram of the U-net neural network topology modifications during training, in accordance with an embodiment. The topology of the U-net neural network is modified to include the 256×256 layers. Corresponding conversion layers, linear interpolators, downsamplers, and upsamplers are also added as the topology is modified. When training is completed for the topology shown in FIG. 2I, the topology of the U-net neural network is further modified to include the 512×512 layers, producing the topology shown in FIG. 2C. A person skilled in the art will appreciate that toward the end of the training, only two of the "F" layers are active due to the linear interpolation operations. In other embodiments, the inactive "F" layers may be removed from the neural network as soon as they become inactive.

When the training dataset includes high resolution training input images, the input images included in the training dataset are modified (downsampled) before being input to the U-net neural network until the U-net neural network is fully trained and a final topology is achieved. When the training dataset includes high resolution training output images, the output images generated by the U-net neural network are up sampled before being compared with the output training data by the training loss unit 105 or 205. Alternatively, the training output data included in the training dataset are modified (downsampled) and compared by the training loss unit 105 or 205 with the highest resolution output image generated by an output layer of the decoder. The final topology of the U-net neural network may be predetermined and one or more layers are added or removed as the U-net neural network is trained for each increment of output data resolution (increasing or decreasing).

Beginning training of the U-net neural network with lower density training data provides stability for each topology of the U-net neural network, even when the number of layers increases, to generate high resolution network output images. Progressively modifying the topology during training also reduces training time compared with beginning training with all of the layers. Additionally, progressively modifying the topology also improves stability during training and enables training of deeper neural networks. The learning rate may set be higher for training a neural network while progressively modifying the topology, reducing training time for each resolution. For example, the learning rate may be increased by 5×, compared with conventional training of a neural network, without causing stability issues when training a progressively modified neural network.

Figure 2J:
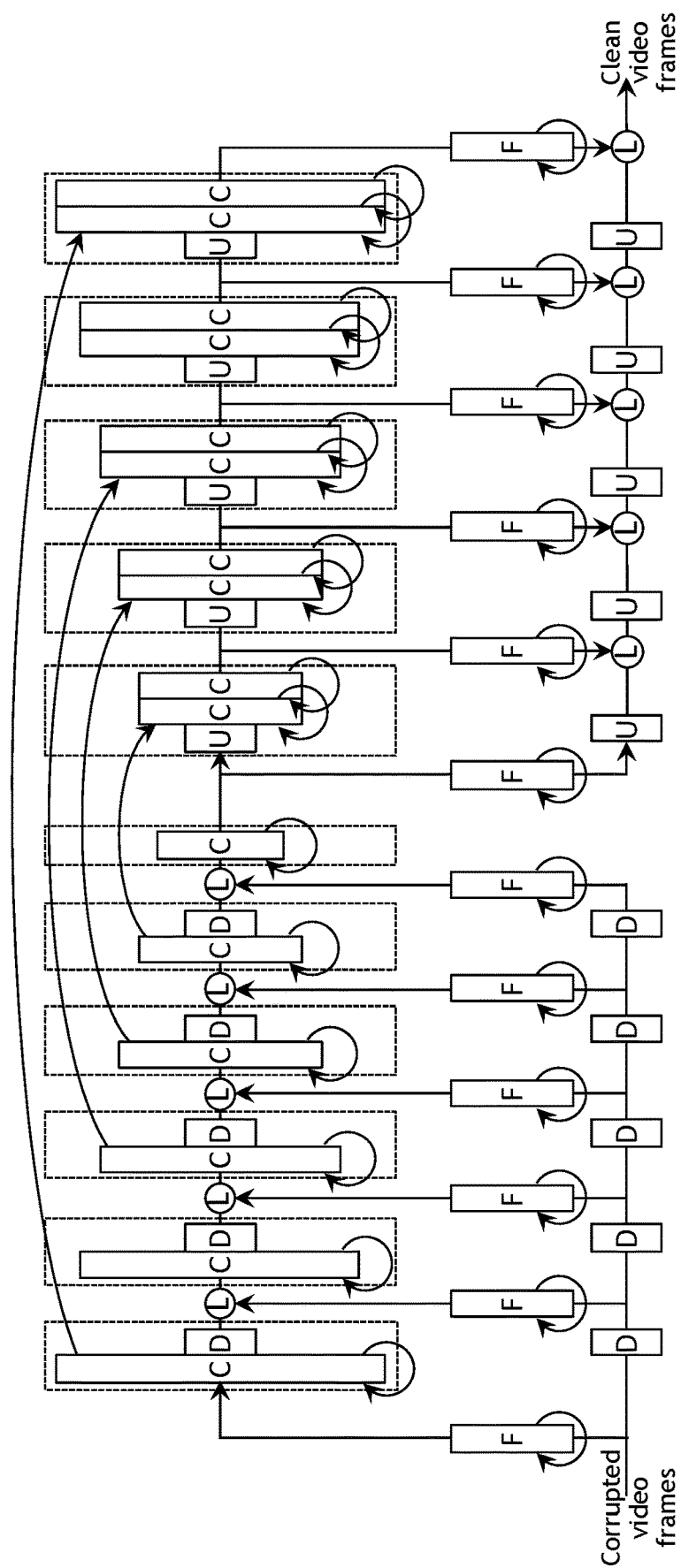
FIG. 2J illustrates a conceptual diagram of a recurrent U-net neural network topology for training with progressive topology modifications, in accordance with an embodiment.

FIG. 2J illustrates a conceptual diagram of a recurrent U-net neural network topology for training with progressive topology modifications, in accordance with an embodiment.

Recurrent neural networks are otherwise similar to their non-recurrent counterparts, except that some of their layers contain recurrent feedback connections that pass the output produced by the layer at a given time step as the input of the same layer at one or more subsequent time steps. In other embodiments, not all of the recurrent connections shown in FIG. 2J may necessarily be present. One or more layers may include recurrent connections. A recurrent U-net neural network topology may also be trained using progressive growing by adding or removing layers, as previously described in conjunction with the U-net neural network. A recurrent version of a U-net neural network with the skip connections removed may also be trained using progressive modification. The recurrent U-net neural or other recurrent neural network, may be trained to process video data, including hidden state representing features changing from frame-to-frame over time.

When a recurrent U-net neural network is trained to generate video data, both the encoder and decoder portions are simultaneously and progressively modified, with the training starting with easier low-resolution video data, and adding new layers that introduce higher-resolution details as the training progresses. Furthermore, recurrent versions of an autoencoder, object detector, image classifier, or other recurrent neural network may also be trained using progressive modification. The training data is modified during the training, starting with low-resolution video data, and increasing the resolution of the images as new layers are added that process higher resolution details.

Progressively modifying the topology of the neural network 110 or 210 reduces the total training time. In an embodiment, the total training time is reduced by about a factor of two. Modifying the neural network 110 or 210 during training greatly stabilizes the training and enables convergence to a better optimum. In particular, progressive modification may enable the recurrent U-net neural network to produce video data of higher quality compared with conventional techniques. The improved convergence is explained by an implicit form of curriculum learning that is imposed by the gradually increasing capacity of the neural network 110 or 210. Without progressive modification, all layers of the neural network 110 or 210 are tasked with simultaneously finding succinct intermediate representations for both the large-scale variation and the small-scale detail. With progressive modification, however, the existing low-density layers are likely to have already converged early on, so the neural network 110 or 210 is only tasked with refining the representations by increasingly smaller-scale effects as new layers are introduced. For training time, progressive modification gains a significant head start because the neural network 110 or 210 is shallow and quick to evaluate at the beginning.

Parallel Processing Architecture

Figure 3:
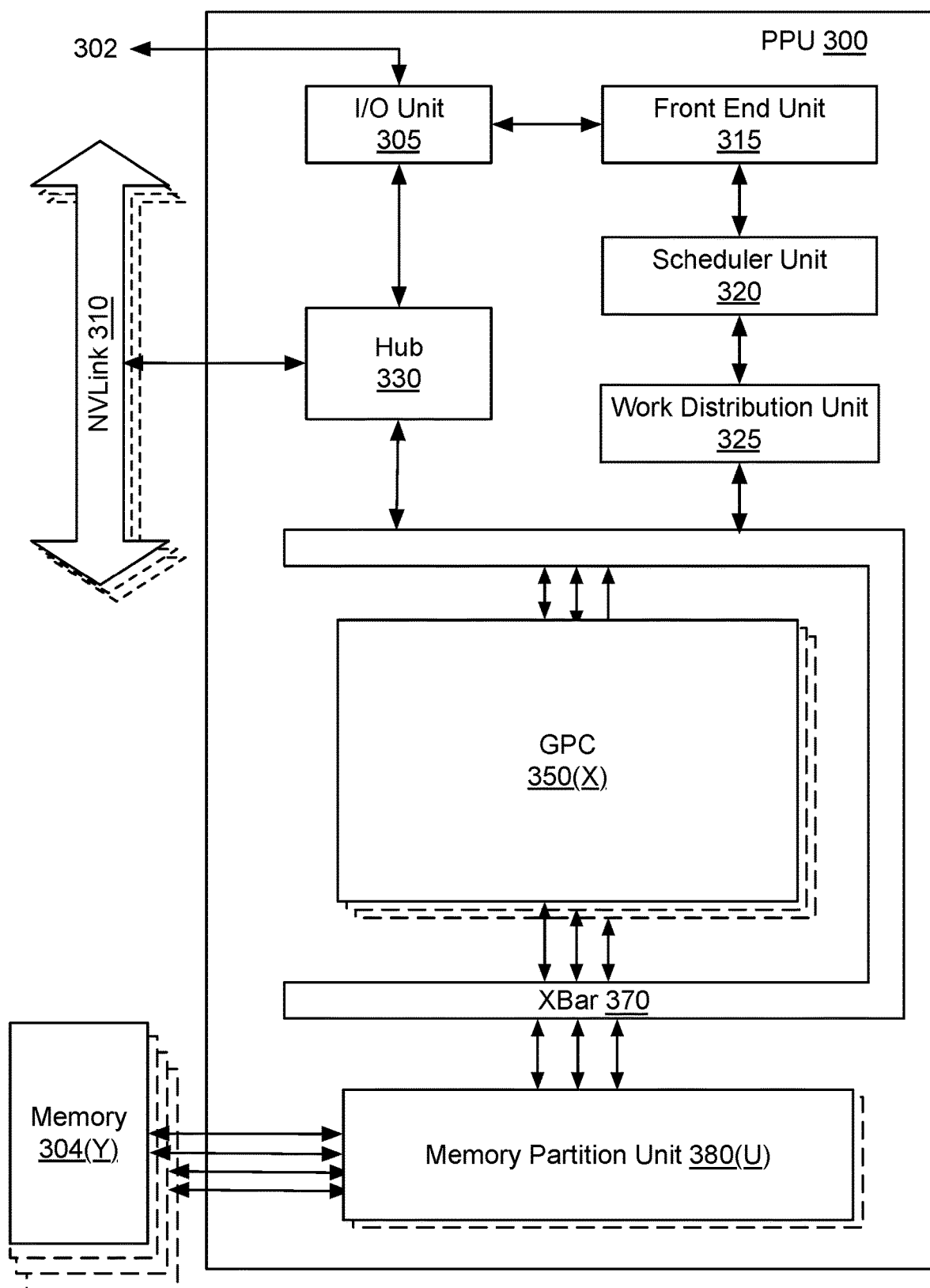
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In another embodiment, the PPU 300 is configured to implement the neural network system 100. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
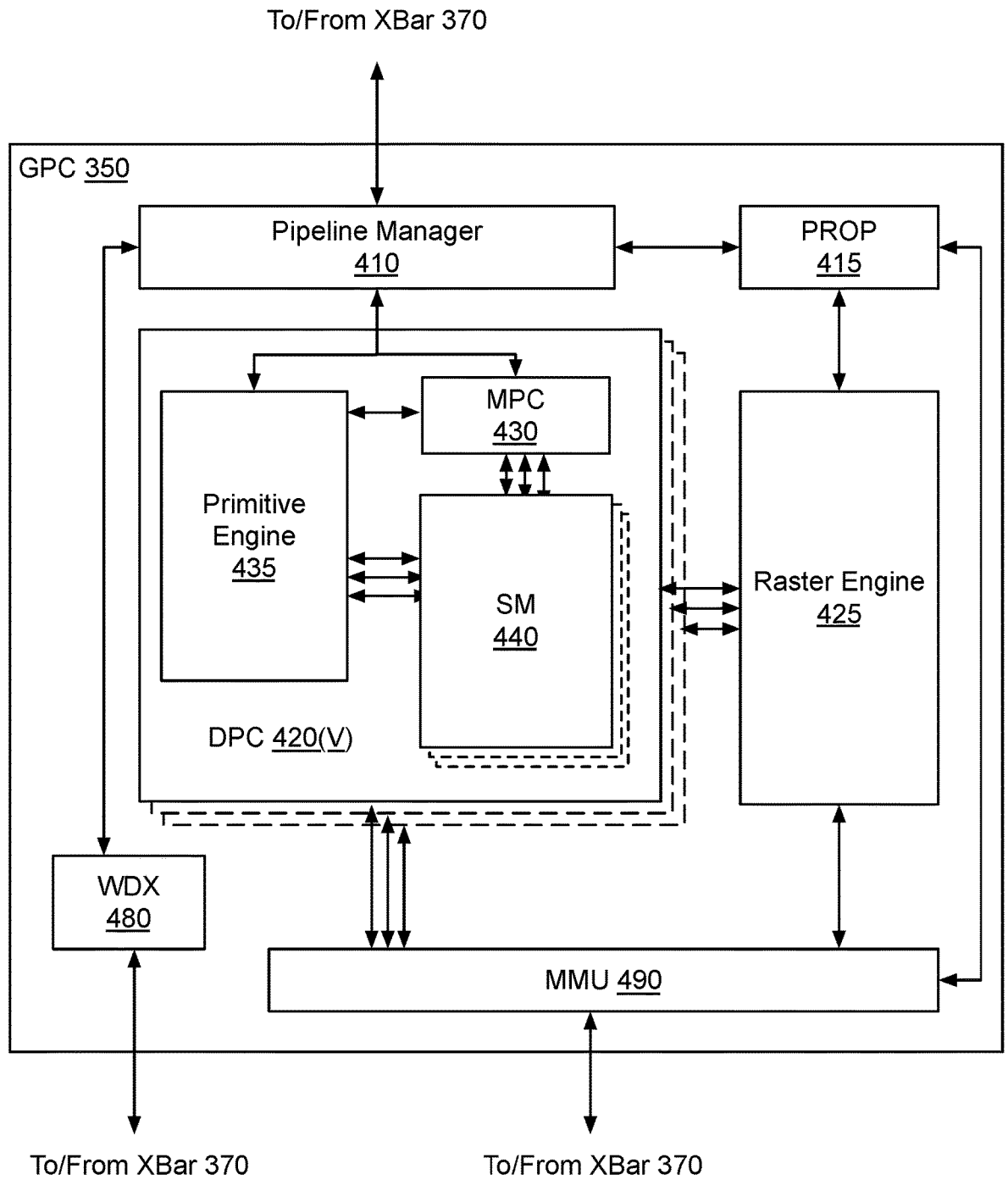
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
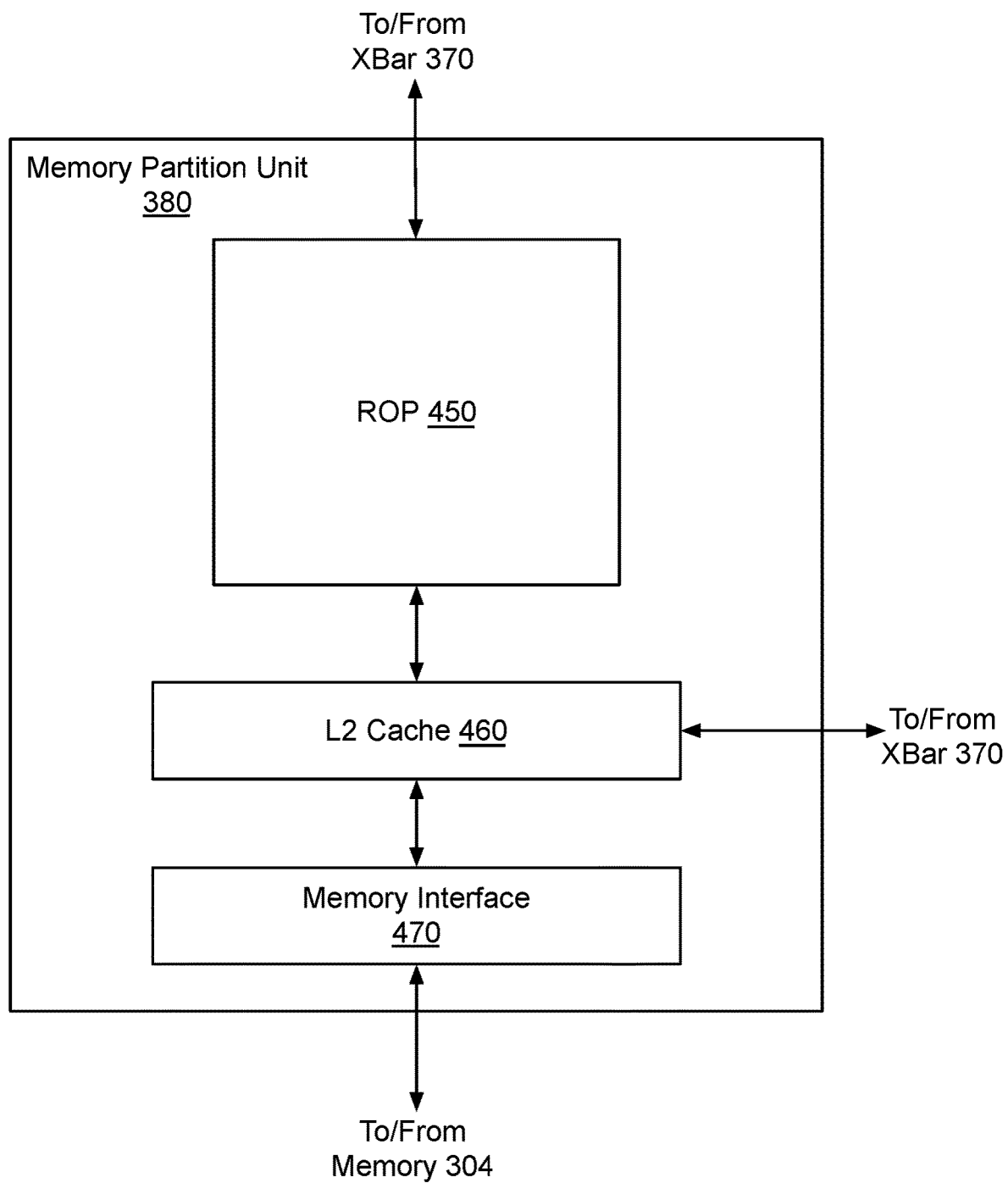
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
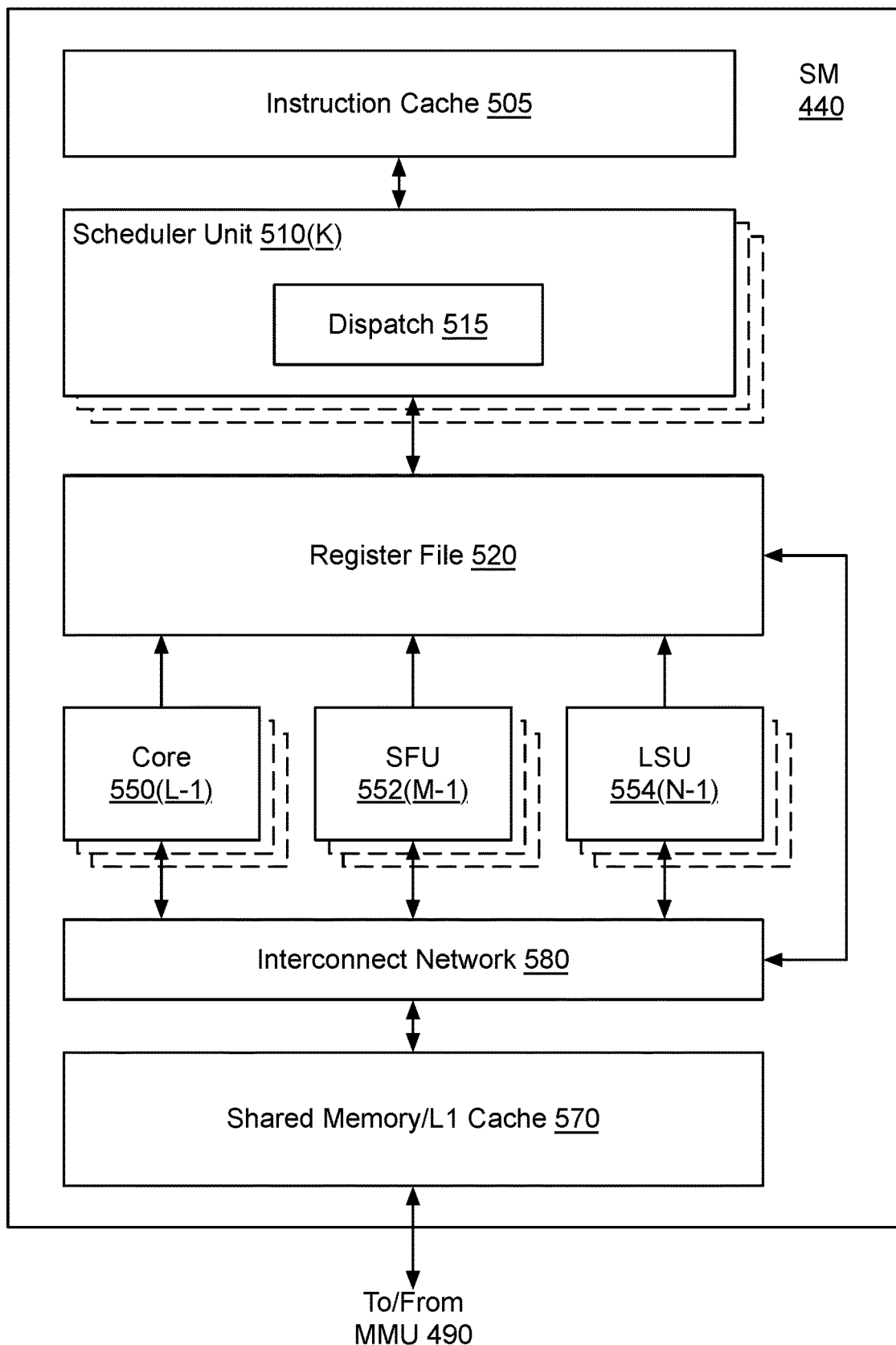
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement to fxture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like.

In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
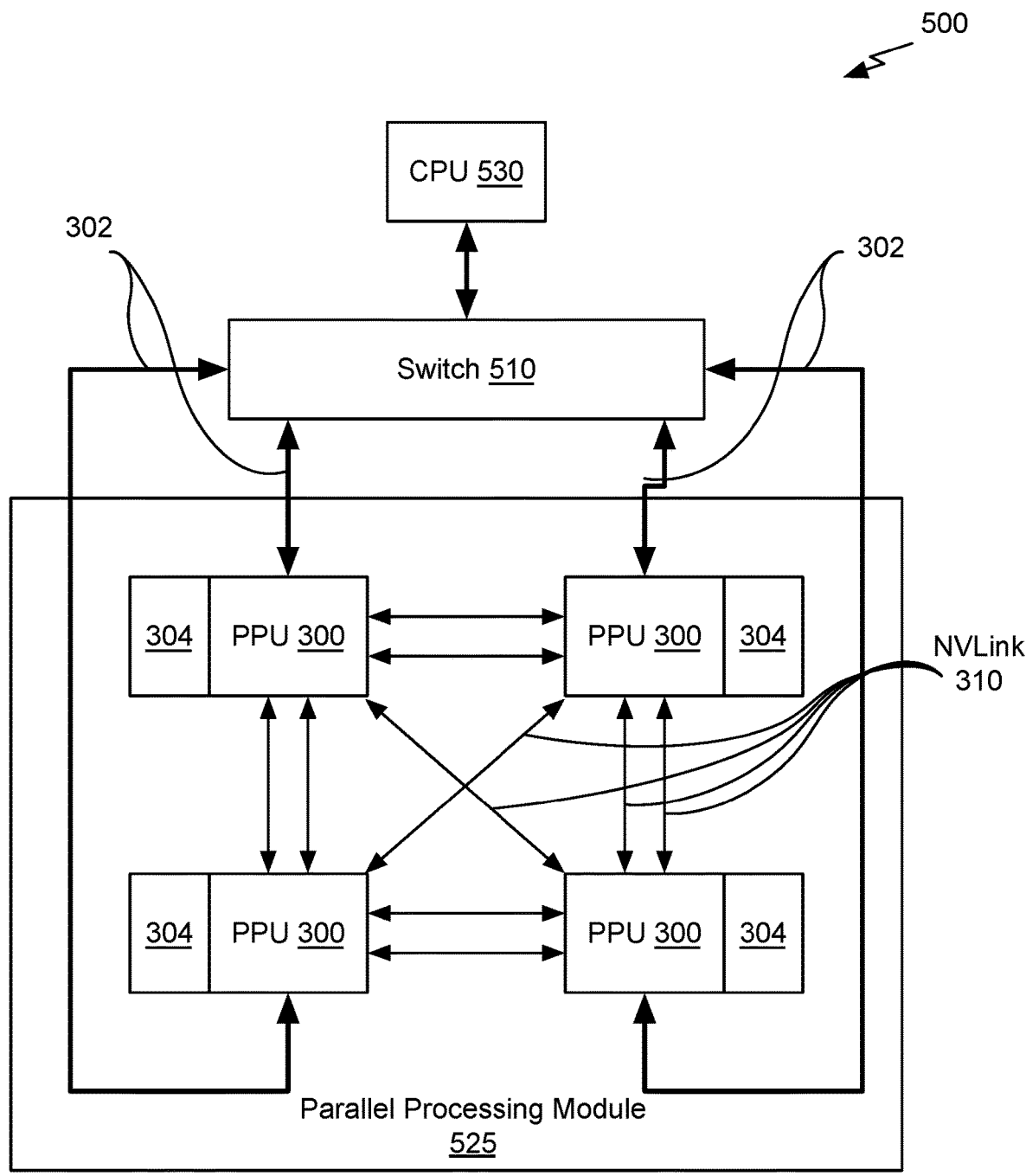
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 130 shown in FIG. 1H and/or the method 250 shown in FIG. 2A. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
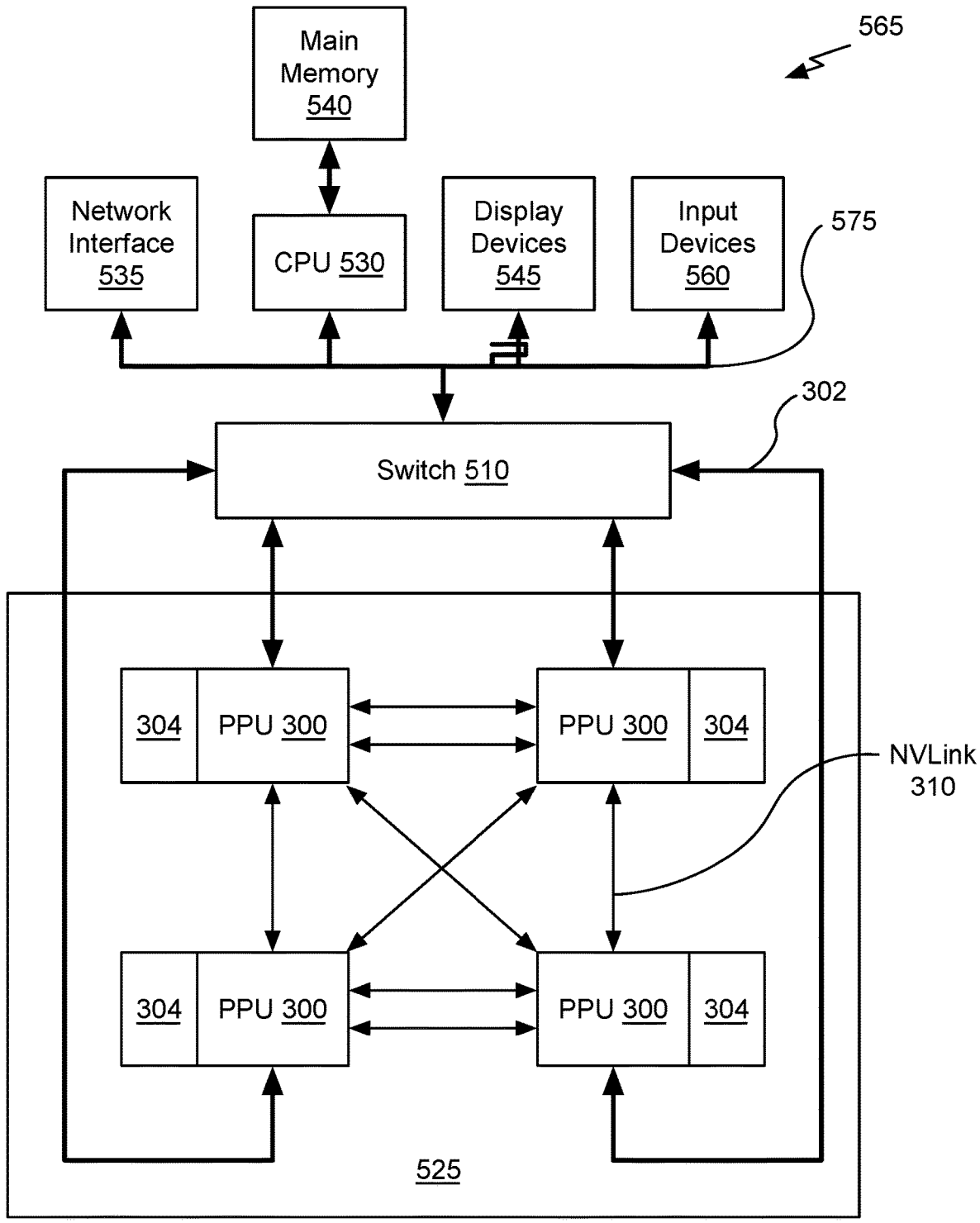
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 130 shown in FIG. 1H and/or the method 250 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
   training, for a first time duration, a neural network using a training dataset including training input data and training output data, wherein a topology of the neural network comprises features and interconnections between the features, the training comprising:
      modifying at least one of the training input data and the training output data to produce first modified training data;
      processing the training input data or the first modified training input data by the neural network according to parameters of the neural network to produce network output data; and
      updating the parameters to reduce differences between the network output data and the training output data or the first modified training output data;
   modifying the topology of the neural network to produce a modified neural network;
   modifying at least one of the training input data and the training output data to be consistent with the modified neural network to produce second modified training data that is different compared with the first modified training data; and
   training the modified neural network for a second time duration using the second modified training data.

2. The computer-implemented method of claim 1, wherein modifying the topology changes a processing capacity of the neural network.

3. The computer-implemented method of claim 1, wherein the topology is modified by adding at least one layer in the neural network.

4. The computer-implemented method of claim 1, wherein the topology is modified by removing at least one layer from the neural network.

5. The computer-implemented method of claim 1, wherein at least one of the training input data and the training output data is downsampled to produce the first modified training data.

6. The computer-implemented method of claim 1, wherein modifying the training output data comprises increasing or decreasing a density of the training output data.

7. The computer-implemented method of claim 1, wherein the training output data is image data and modifying the training output data comprises decreasing a pixel resolution of the training output data.

8. The computer-implemented method of claim 1, wherein modifying the training input data comprises increasing or decreasing a density of the training input data.

9. The computer-implemented method of claim 1, wherein the training input data is image data and modifying the training input data comprises decreasing a pixel resolution of the training input data.

10. The computer-implemented method of claim 1, further comprising, during the second time duration, smoothly modifying the topology.

11. The computer-implemented method of claim 10, wherein first intermediate values generated by the neural network using the topology are interpolated with second intermediate values generated by the neural network using the modified topology.

12. The computer-implemented method of claim 1, further comprising, during the second time duration, interpolating between the first modified training data and the second modified training data.

13. The computer-implemented method of claim 1, wherein the neural network is a classification neural network.

14. The computer-implemented method of claim 1, wherein the neural network is an autoencoder neural network.

15. The computer-implemented method of claim 1, wherein the neural network is an object detection neural network and the network output data comprises zero or more labels for zero or more locations in the input data.

16. The computer-implemented method of claim 1, wherein the neural network is a segmentation neural network.

17. The computer-implemented method of claim 1, wherein the neural network is a recurrent neural network.

18. The computer-implemented method of claim 1, wherein the topology is modified by adding one layer to an encoder portion of the neural network and one layer to a decoder portion of the neural network.

19. A system, comprising:
a neural network comprising features and interconnections between the features, wherein the neural network is trained using a training dataset including training input data and training output data, the training comprising:
  modifying at least one of the training input data and the training output data to produce first modified training data for a first time duration;
  processing the training input data or the first modified training input data by the neural network according to parameters of the neural network to produce network output data for the first time duration;
  updating the parameters to reduce differences between the network output data and the training output data or the first modified training output data for the first time duration;
  after the first time duration, modifying the topology of the neural network to produce a modified neural network;
  modifying at least one of the training input data and the training output data to be consistent with the modified neural network to produce second modified training data that is different compared with the first modified training data; and
  training the modified neural network for a second time duration using the second modified training data.

20. A non-transitory computer-readable media storing computer instructions for training a neural network that, when executed by one or more processors, cause the one or more processors to perform the steps of:
  training, for a first time duration, the neural network using a training dataset including training input data and training output data, wherein a topology of the neural network comprises features and interconnections between the features, the training comprising:
    modifying at least one of the training input data and the training output data to produce first modified training data;
    processing the training input data or the first modified training input data by the neural network according to parameters of the neural network to produce network output data; and
    updating the parameters to reduce differences between the network output data and the training output data or the first modified training output data;
  modifying the topology of the neural network to produce a modified neural network;
  modifying at least one of the training input data and the training output data to be consistent with the modified neural network to produce second modified training data that is different compared with the first modified training data; and
  training the modified neural network for a second time duration using the second modified training data.

* * * * *